United States Patent
Kato et al.

(10) Patent No.: US 8,138,246 B2
(45) Date of Patent: Mar. 20, 2012

(54) POLYMER ELECTROLYTE, ELECTROCHEMICAL DEVICE, AND ACTUATOR ELEMENT

(75) Inventors: Toshinori Kato, Tsukuba (JP); Hiroyuki Ohgi, Tsukuba (JP); Masayoshi Watanabe, Yokohama (JP)

(73) Assignees: Kuraray Co., Ltd., Kurashiki-shi (JP); Yokohama National University, Yokohama-shi (JP)

( * ) Notice: Subject to any disclaimer, the term of this patent is extended or adjusted under 35 U.S.C. 154(b) by 228 days.

(21) Appl. No.: 12/444,461

(22) PCT Filed: Oct. 2, 2007

(86) PCT No.: PCT/JP2007/069281
§ 371 (c)(1),
(2), (4) Date: Apr. 6, 2009

(87) PCT Pub. No.: WO2008/044546
PCT Pub. Date: Apr. 7, 2008

(65) Prior Publication Data
US 2010/0035158 A1  Feb. 11, 2010

(30) Foreign Application Priority Data
Oct. 6, 2006  (JP) .................... 2006-274787

(51) Int. Cl.
*C08K 5/34* (2006.01)
(52) U.S. Cl. .......... 524/106; 524/99; 524/115; 524/186
(58) Field of Classification Search ............ 524/99, 524/106, 115, 186, 505
See application file for complete search history.

(56) References Cited

U.S. PATENT DOCUMENTS

| | | | |
|---|---|---|---|
| 6,444,369 B1 | 9/2002 | Kamino et al. | |
| 6,924,341 B2* | 8/2005 | Mays et al. | 526/89 |
| 2005/0221193 A1* | 10/2005 | Kinouchi et al. | 429/306 |

FOREIGN PATENT DOCUMENTS
EP   1 449 886 A1   8/2004
(Continued)

OTHER PUBLICATIONS

Yiyong He et al. J. Phys. Chem. B 2007, 111, 4645-4652.*
(Continued)

*Primary Examiner* — David W Wu
*Assistant Examiner* — Vu A Nguyen
(74) *Attorney, Agent, or Firm* — Oblon, Spivak, McClelland, Maier & Neustadt, L.L.P.

(57) ABSTRACT

A polymer electrolyte which comprises an ionic liquid (A) and a block copolymer (B) as essential ingredients, which block copolymer (B) comprises one or more of polymer block(s) (P) being compatible with (A) and one or more of polymer block(s) (Q) being incompatible with (A). (A) and (P) mutually dissolve each other to form one phase (X), and (Q) forms a phase (Y) being incompatible with phase (X), and phase (X) and phase (Y) are mutually micro phase separated. The polymer electrolyte of the present invention shows practical ion conductivity, is excellent in retention of ionic liquid, and moreover, is also excellent in heat resistance and mechanical strength. Furthermore, the electrochemical device and actuator element of the invention are swiftly displaced in accordance with application of a voltage, and can be actuated stably for a long period due to the liquid-retaining property and mechanical strength of the polymer electrolyte used, and, therefore, can suitably be used in the fields of medical instruments, micro-machines, industrial robot, personal robot, etc.

19 Claims, 2 Drawing Sheets

FOREIGN PATENT DOCUMENTS

| | | |
|---|---|---|
| JP | 63-309252 | 12/1988 |
| JP | 4-275078 | 9/1992 |
| JP | 2002-3478 | 1/2002 |
| JP | 2002 3478 | 1/2002 |
| JP | 2003-257240 | 9/2003 |
| JP | 2003 257240 | 9/2003 |
| JP | 2004-98199 | 4/2004 |
| JP | 2004-281147 | 10/2004 |
| JP | 2005-51949 | 2/2005 |
| JP | 2006-32237 | 2/2006 |
| JP | 2006-81374 | 3/2006 |
| JP | 2006-125396 | 5/2006 |
| JP | 2006 310071 | 11/2006 |
| JP | 2006-310071 | 11/2006 |
| WO | 00 01026 | 1/2000 |
| WO | WO 2004/085567 A2 | 10/2004 |
| WO | WO 2007142731 A2 * | 12/2007 |

OTHER PUBLICATIONS

Yiyong He et al. JACS 2006, 128, 2745-2750.*
Simone et al. Macromol. Chem. Phys. 2007, 208, 339-348.*
Denshi to Ion no Kinoukagaku Siriiz, "Daiyoryo Denkinijuso Kyapasita no Saizensen", Enu Tii Esu (Series of Chemistry of Function of Electrons and Ions, vol. 2, "Frontier of Large Capacity Electrical Double Layer Capacitor", NTS, 2001, 9 pages.
Md. Abu Hasan Susan, et al., "Ion Gels Prepared by in Situ Radical Polymerization of Vinyl Monomers in an Ionic Liquid and Their Characterization as Polymer Electrolytes", Journal of American Chemical Society, vol. 127, 2005, pp. 4976-4983.
Md. Shiro Seki, et al., "Distinct Difference in Ionic Transport Behavior in Polymer Electrolytes Depending on the Matrix Polymers and Incorporated Salts", Journal of Physical Chemistry, vol. 109, 2005, pp. 3886-3892.
Expected Materials for the Future, vol. 5, No. 10, 2005, pp. 14-19.
Joan Fuller, et al., "Ionic liquid-polymer gel electrolytes from hydrophilic and hydrophobic ionic liquids", Journal of the Electroanalytical Chemistry, vol. 459, No. 1, XP-001006325, Jan. 1, 1998, pp. 29-34.
U.S. Appl. No. 12/523,814, filed Jul. 20, 2009, Ohgi, et al.

* cited by examiner

POLYMER ELECTROLYTE, ELECTROCHEMICAL DEVICE, AND ACTUATOR ELEMENT

CROSS REFERENCE TO RELATED APPLICATION

This application is a 371 of PCT/J07/069281, filed on Oct. 2, 2007, and claims priority to Japanese Patent Application No. 2006-274787, filed on Oct. 6, 2006.

TECHNICAL FIELD

This invention relates to a polymer electrolyte comprising an ionic liquid and a specific block copolymer as essential ingredients, and an electrochemical device or actuator element containing the polymer electrolyte as a constituent.

BACKGROUND ART

In recent years, in order to heighten the performance and safety of secondary batteries and electrochemical devices including capacitors, many studies have been made to use novel electrolytes in place of electrolytes which have hitherto been used As such electrolytes, in general, there have so far been used liquid electrolytes wherein an ionic compound is dissolved in an organic solvent which is electrochemically comparatively stable (see, for example, Non-patent Document 1). However in this case, there has been pointed out that since there is a liquid having fluidity inside the electrochemical device, when the device was used for a long time, when the device was heated from the outside by a certain reason or when the device was physically destroyed due to the breakdown of some instrument, there is a possibility that the electrolyte liquid leaks from the inside of the electrochemical device to the outside.

In order to prevent the leak of the electrolyte liquid and further heighten safety, many studies have so far been made to use gel electrolytes or polymer electrolytes in place of liquid electrolytes which have hitherto been used (see, for example, Non-patent Document 1). However, even in this case, a danger has not been overcome that the gel electrolytes or polymer electrolytes, which are combustible, may be ignited or burnt at the time of heating.

As polymer electrolytes whose safety is further heightened, there have, for example, been known polymer electrolytes wherein a solid electrolyte such as lithium perchlorate is added to a polymer (see, for example, Patent Document 1). In the case, polyether-type polymers having high affinity to lithium cations are often used. Since ion conduction takes place by link with motion (relaxation) of the polymer chain, ion conductivity is low, and, thus, it can hardly be said that such polymer electrolytes, when used as electrochemical devices, are sufficient in performance. In order to overcome this, there is often a case where a high polar organic solvent such as acetonitrile or propylene carbonate is added, but, in the case, a danger of inflammation, ignition or combustion cannot be avoided.

For coping with problems like this, there have, in recent years, been reported studies on solid electrolytes wherein an ionic liquid as a novel electrolyte is solidified (see, for example, Patent Documents 2 and 3 and Non-patent Documents 2 and 3). Since ionic liquids are generally noninflammable, a danger of inflammation, ignition or combustion of the electrolyte is overcome, and, at the same time, since the ionic liquids are immobilized, the problem of leak of electrolyte liquids from electrochemical devices is also greatly improved. In these solid electrolytes, since an ionic liquid is mixed with an epoxy compound or methacrylate monomer or the like to be solidified through chemical crosslinking or polymerization, there has been a problem that the obtained solidified product no longer has thermoplasticity, and it is impossible to mold the product into any shape by thermoforming, solution casting, a printing method or a coating method. In the above, it is not meant that ionic liquids are actually solidified, and "solidifying" means a "confined" state or an "immobilized" state.

As thermoplastic polymer electrolytes, ones using a graft copolymer are considered. For example, there is disclosed in the comparative example of Patent Document 1 a polymer electrolyte using as an electrolyte lithium perchlorate, and as a polymer a graft copolymer wherein a polyethylene glycol chain is grafted onto a polyethylene. Therein, although when an ionic liquid is used in place of lithium perchlorate, comparatively high ion conductivity can be obtained, there is a problem that the mechanical strength of the polymer electrolyte is low and bleeding-out of the ionic liquid tends to occur, and, thus, there are problems that the polymer electrolyte is poor in stability of performance, stability of a long-period use, and handling properties.

On the other hand, in the fields of medical instruments, micro-machines, etc., need for miniature and lightweight actuators increases. Further, also in the fields of industrial robots, personal robots, etc., need for lightweight and flexible actuators increases.

It is said that since when an actuator is miniaturized, friction and viscosity become dominant than inertial force, a mechanism to convert energy into motion utilizing inertial force, as in motors and engines, is hard to use as an actuator for microminiature machines. As kinds of microminiature actuators in view of actuation mechanisms so far proposed, an electrostatic actuator, a piezoelectric actuator, an ultrasonic motor, a shape memory alloy actuator, etc. are known. An electrostatic actuator is one wherein a plate or rod as one of the electrodes is attracted to the counter electrode, and one wherein one of the electrodes is bent by applying a voltage of the order of 100 V between the electrode and the other counter electrode scores of µm apart from the former electrode is known. A piezoelectric actuator is one wherein a voltage of several V is applied to the piezoelectric element made of a ceramic such as barium titanate to make the element expand and contract, and one capable of controlling a displacement of the order of nm is known. As an ultrasonic motor, one to be driven by causing dislocation with a combination of ultrasonic oscillation generated by a piezoelectric element or the like and frictional force is known. A shape memory alloy actuator largely changes in shape in accordance with temperature, and is driven by changing temperature. However, these types of actuators have problems that since they are made of inorganic substance(s) such as metal(s) or ceramic(s), there is a limitation in softening and/or lightening thereof; and since they are complicated in structure, their miniaturization is not so easy; and so on.

As actuators capable of overcoming the above problems, polymer actuators draw attention recently. For example, polymer actuators utilizing change in the shape of hydrated polymer gels due to stimulation such as temperature change, pH change or application of electric field are devised (see, for example, Patent Document 4). However, since the change in shape of hydrated polymer gels due to various stimulations is generally very slow, and, further, the mechanical strength of hydrated polymer gels is low due to their not uniform crosslinking structure, further improvement is necessary for actually utilizing such a polymer actuator as an actuator.

In order to overcome the above problems, polymer actuators are devised which is composed of an ion-exchange polymer membrane and electrodes bonded to both surfaces thereof, and wherein an electric potential difference is applied to the ion-exchange polymer membrane to bend and deform the membrane (see, for example, Patent Document 5). However, since water is indispensable for actuation of the polymer actuators, there is a problem that the environment of actuation thereof is limited to a wet environment.

In order to overcome this problem, there is reported polymer actuators wherein two electrodes each consisting of an ionic liquid, a fluorine-containing crystalline polymer and single wall carbon nanotubes are stuck on both surfaces of a polymer electrolyte consisting of the ionic liquid and a fluorine-containing crystalline polymer (see, for example, Non-patent Document 4). Further, there is reported polymer actuators wherein two pieces of gold foil as an electrode are stuck on a polymer electrolyte prepared by mixing an ionic liquid, a monomer and a crosslinking agent and curing them (see, for example, Patent Document 6). However, as to the former, there is a problem that since fluorine-containing crystalline polymers are poor in liquid-retaining property of ionic liquids, the ionic liquid bleeds out from the polymer electrolyte. On the other hand, as to the latter, there is a problem that since the ionic liquid is immobilized by crosslinking, the polymer electrolyte is narrow in room of selection of shapes.

Patent Document 1: JP-A-2004-98199
Patent Document 2: JP-A-2004-281147
Patent Document 3: JP-A-2006-32237
Patent Document 4: Tokkai-sho 63-309252 (JP-A-1988-309252)
Patent Document 5: Tokkai-hei 4-275078 (JP-A-1992-275078)
Patent Document 6: JP-A-2005-51949
Non-patent Document 1: Denshi to ion no Kinoukagaku siriiz vol. 2, "Daiyoryo Denkinijuso Kyapasita no Saizensen", Enu Tii Esu (Series of Chemistry of Function of Electrons and Ions Vol. 2, "Frontier of Large Capacity Electrical Double Layer Capacitor", NTS
Non-patent Document 2: Journal of American Chemical Society, Vol. 127, page 4976, 2005
Non-patent Document 3: Journal of Physical Chemistry, Vol. 109, page 3886, 2005
Non-patent Document 4: Expected Materials for the Future, Vol. 5 No. 10, page 14, 2005

DISCLOSURE OF INVENTION

Problems to be Solved by the Invention

The invention aims to provide a polymer electrolyte, more specifically a polymer electrolyte comprising, as essential ingredients, a specific block copolymer and an ionic liquid, and an electrochemical device, particularly actuator element using the polymer electrolyte.

Means for Solving the Problems

The present inventors intensely studied, and as a result, they found that a polymer electrolyte comprising, as essential ingredients, a block copolymer satisfying specific conditions and an ionic liquid is excellent in ion conductivity, heat resistance, liquid-retaining properties and moldability, and, further, found that this polymer electrolyte can suitably be used for electrochemical devices, particularly actuator elements, and completed this invention.

Namely, this invention relates to a polymer electrolyte which comprises an ionic liquid (A) and a block copolymer (B) as essential ingredients, which block copolymer (B) comprises one or more of polymer block(s) (P) being compatible with ionic liquid (A) and one or more of polymer block(s) (Q) being incompatible with ionic liquid (A).

It is preferred that ionic liquid (A) and polymer block (P) mutually dissolve each other to form one phase (X), and polymer block (Q) forms a phase (Y) being incompatible with phase (X), and phase (X) and phase (Y) are mutually micro phase separated.

As ionic liquid (A), there can be used an ionic liquid consisting of at least one cation selected from organic cations represented by the later-described general formulae (I) to (V) and at least one anion selected from halogen-containing anions, mineral acid anions and organic acid anions, but an ionic liquid containing as the cation component an imidazolium cation represented by the general formula (I) is preferred, and the ionic liquid is, more preferably, at least one selected from ethylmethylimidazolium bis(trifluoromethanesulfonyl)imide (EMITFSI), ethylmethylimidazolium bis(pentafluoroethanesulfonyl)imide (EMIPFSI), butylmethylimidazolium bis(trifluoromethanesulfonyl)imide (BMITFSI) and butylmethylimidazolium bis(pentafluoroethanesulfonyl)imide (BMIPFSI), still more preferably EMITFSI or EMIPFSI and most preferably EMITFSI.

It is preferred that polymer block (P) composing block copolymer (B) is a homopolymer block or copolymer block of at least one selected from esters of (meth)acrylic acid with an alkanol having 1 to 3 carbon atoms; monoesters of (meth) acrylic acid with an alkylene glycol having 2 to 4 carbon atoms, a dialkylene glycol having 4 to 6 carbon atoms or a trialkylene glycol having 6 to 9 carbon atoms; esters of (meth) acrylic acid with an alkoxyalkanol having 2 to 4 carbon atoms; esters of (meth)acrylic acid with a monomethyl or monoethyl ether of a dialkylene glycol having 4 to 6 carbon atoms or a trialkylene glycol having 6 to 9 carbon atoms; and esters of (meth)acrylic acid with an aminoalkanol having 2 to 4 carbon atoms.

It is preferred that polymer block (Q) composing block copolymer (B) is a polymer block having an aromatic vinyl compound unit as a repeating unit; a crystalline polyolefin block; a polymer block of an ester of methacrylic acid with an alkanol having 4 or more carbon atoms; a poly(cyclohexyl methacrylate) block; a poly(isobornyl methacrylate) block; or a random copolymer block of n-butyl methacrylate or isobutyl methacrylate with isobornyl methacrylate.

Apart from the above, it is preferred that block copolymer (B) is a polyurethane which comprises a polymer block (P) consisting of a polymeric polyol component, and a polymer block (Q) consisting of a reaction product component of a diisocyanate with a chain extender.

It is further preferred that the above polymer block (Q) consists of a reaction product component of 4,4'-diphenylmethane diisocyanate with 1,4-butanediol.

This invention also relates to an electrochemical device containing as a constituent the above polymer electrolyte, and particularly, an actuator element which comprises a molding consisting of the above polymer electrolyte, and at least two electrodes bonded to the molding and mutually insulated, and which actuator element can be curved or deformed by giving an electric potential difference between the two electrodes.

Effects of the Invention

The polymer electrolyte of the invention comprises an ionic liquid (A) and a block copolymer (B) as essential ingredients, which block copolymer (B) comprises one or more of polymer block(s) (P) being compatible with ionic liquid (A) and one or more of polymer block(s) (Q) being incompatible with ionic liquid (A). In the polymer electrolyte, a component consisting of ionic liquid (A) and polymer block (P) bears ion conductivity, and a component consisting of polymer block (Q) acts as a physical crosslinking point to solidify ionic liquid (A), and, thus, the polymer electrolyte can hold self-standing properties without introduction of chemical crosslinking. Especially, when a phase (X) consisting of ionic liquid (A) and polymer block (P) and a phase (Y) consisting of polymer block (Q) are mutually micro phase separated, ion conductivity and shape-holding properties or the like are made compatible in a high level because phase (X) and phase (Y) fulfill different functions, respectively. Furthermore, since the polymer electrolyte of the invention does not have chemical crosslinking, it can be molded into various shapes utilizing various molding methods such as thermoforming, printing method or coating method.

Electrochemical devices, particularly actuator elements using the above polymer electrolyte are excellent in properties of fast response, stability and freedom of shapes, depending on excellent ion conductivity, liquid-retaining properties and moldability of the polymer electrolyte, and it comes to be possible to apply the actuator element for more various uses such as artificial muscles.

BEST MODE FOR CARRYING OUT THE INVENTION

The polymer electrolyte of the invention comprises an ionic liquid (A) and a block copolymer (B) as essential ingredients, which block copolymer (B) comprises one or more of polymer block(s) (P) being compatible with ionic liquid (A) and one or more of polymer block(s) (Q) being incompatible with ionic liquid (A).

Ionic liquid (A) used in the invention is also referred to as a fused salt at room temperature or merely a fused salt, and is a salt showing a fused state over a wide temperature range including moderate temperatures such as room temperature.

In the invention, various ionic liquids so far known can be used, but ones are preferred which show a liquid state and are stable at room temperature or at temperatures as possible as nearer to room temperature. In the invention, ionic liquids are preferably used which are fused salts at room temperature and have an ion conductivity at room temperature of 0.001 S/cm or more.

As examples of organic cations composing suitable ionic liquids used in the invention, there can be mentioned imidazolium cations represented by the general formula (I), pyridinium cations represented by the general formula (II), ammonium cations represented by the general formula (III), phosphonium cations represented by the general formula (IV) and sulfonium cations represented by the general formula (V).

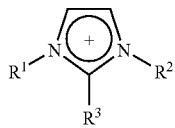
(I)

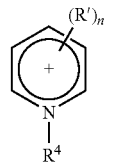
(II)

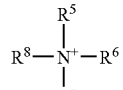
(III)

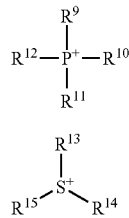
(IV)

(V)

$R^{13}$
|
$R^{15}$—$S^+$—$R^{14}$ wherein $R^1$ to $R^{14}$, respectively independently, represent groups selected from hydrogen atoms, straight-chain or branched alkyl groups having 1 to 10 carbon atoms, straight-chain or branched alkenyl groups having 2 to 10 carbon atoms, aryl groups having 6 to 15 carbon atoms, aralkyl groups having 7 to 20 carbon atoms, and (poly)oxyalkylene groups having 2 to 30 carbon atoms, R' represents a straight-chain or branched alkyl group having 1 to 6 carbon atoms, n represents an integer of 0 or more but 5 or less, and, among $R^5$ to $R^8$, $R^9$ to $R^{12}$, and $R^{13}$ to $R^{15}$, respectively, two groups and the central hetero atom can be combined to form a cyclic structure.

In the above, as each alkyl group, ones having 1 to 6 carbon atoms are preferred and ones having 1 to 4 carbon atoms are further preferred, there can specifically be mentioned methyl group, ethyl group, n-propyl group, i-propyl group, n-butyl group, etc. As each alkenyl group, ones having 2 to 6 carbon atoms are preferred and ones having 2 to 4 carbon atoms are further preferred, there can specifically be mentioned vinyl group, 2-propenyl group, etc. As each aryl group, there can be mentioned phenyl group, etc. and as each aralkyl group, there can be mentioned benzyl group, etc. As (poly)oxyalkylene groups, there can be mentioned groups represented by the general formula —($R^{16}$—O)$_p$H wherein $R^{16}$ represents an ethylene group or a propylene group, and p represents an integer of 1 to 10. As the case where two groups cooperate and form a cyclic structure, there can, for example, be mentioned a case where a pyrrolidine ring or a piperidine ring is formed including the central nitrogen atom in the general formula (IV).

Among them, in view of the ion conductivity and availability of ionic liquids, imidazolium cations represented by the general formula (I) are preferred. Therein, in view of the melting point and ion conductivity of ionic liquids, $R^1$ and $R^2$ in the general formula (I) are preferably straight-chain or branched alkyl groups having 1 to 6 carbon atoms, and more preferably straight-chain or branched alkyl groups having 1 to 4 carbon atoms, and it is still more preferred that $R^1$ and $R^2$ are different groups. As specific examples of imidazolium cations represented by the general formula (I), there can be mentioned an ethylmethylimidazolium cation (EMI$^+$), a butylmethylimidazolium cation, etc., and an ethylmethylimidazolium cation is supremely preferred.

As examples of anions composing suitable ionic liquids used in the invention, there can be mentioned halogen-containing anions, mineral acid anions, organic acid anions, etc. As examples of halogen-containing anions and mineral acid anions, there can be mentioned $PF_6^-$, $ClO_4^-$, $CF_3SO_3^-$, $C_4F_9SO_3^-$, $BF_4^-$, $(CF_3SO_2)_2N^-$, $(C_2F_5SO_2)_2N^-$, $(CF_3SO_2)_3C^-$, $AsF_6^-$, $SO_4^{2-}$, $(CN)_2N^-$, $NO_3^-$, etc. As examples of organic acid anions, there can be mentioned $R^{17}SO_3^-$, $R^{17}CO_2^-$ [$R^{17}$ represents an alkyl group having 1 to 6 carbon atoms, an alkenyl group having 2 to 6 carbon atoms, an aralkyl group having 7 to 12 carbon atoms, an aralkenyl group having 8 to 14 carbon atoms, an alkoxyalkyl group having 2 to 8 carbon atoms, an acyloxyalkyl group having 3 to 8 carbon atoms, a sulfoalkyl group having 1 to 6 carbon atoms or an aryl group having 6 to 14 carbon atoms (phenyl group, naphthyl group, etc.), and there is no problem if $R^{17}$ contains plural cyclic structures or branched structures], etc. Among them, in view of the ion conductivity and availability of ionic liquids, $PF_6^-$, $ClO_4^-$, $CF_3SO_3^-$, $C_4F_9SO_3^-$, $BF_4^-$, $(CF_3SO_2)_2N^-$, $(C_2F_5SO_2)_2N^-$ and $(CN)_2N^-$ are preferred, and particularly, sulfonyl imide-type anions such as $(CF_3SO_2)_2N^-$, $(C_2F_5SO_2)_2N^-$ are preferred.

As examples of ionic liquids suitably used in the invention, there can be mentioned ionic liquids consisting of a combination of the above-mentioned organic cations and anions. These can be used alone or in a combination of plural. As examples of preferred ionic liquids, there can be mentioned ethylmethylimidazolium bis(trifluoromethanesulfonyl)imide (EMITFSI), ethylmethylimidazolium bis(pentafluoroethanesulfonyl)imide (EMIPFSI), butylmethylimidazolium bis(trifluoromethanesulfonyl)imide (BMITFSI), butylmethylimidazolium bis(pentafluoroethanesulfonyl)imide (BMIPFSI), etc. Among them, in view of the ion conductivity of ionic liquids, EMITFSI and EMIPFSI are further preferred, and, further, in view of availability, EMITFSI is still further preferred.

Block copolymer (B) used in the invention is a block copolymer which comprises one or more of polymer block(s) (P) being compatible with ionic liquid (A) and one or more of polymer block(s) (Q) being incompatible with ionic liquid (A). In the invention, a block copolymer means a copolymer wherein polymer blocks themselves are bonded linearly.

In the invention, judgment of whether ionic liquid (A) and polymer block (P) are compatible or not, and judgment of whether ionic liquid (A) and polymer block (Q) are incompatible or not, are made according to the following judgment criterion. As to any one of phase transition temperatures such as Tα (α transition temperature) and Tg (glass transition temperature) measured by DMA (dynamic mechanical analysis) or DSC (differential scanning calorimetry) of block copolymer (B), one derived from the P component is named $T_P$, and one derived from the Q component is named $T_Q$. On the other hand, as to phase transition temperatures measured by DMA or DSC of a polymer electrolyte comprising the block copolymer (B) and ionic liquid (A) as essential ingredients, one derived from phase (X) (a phase consisting of polymer block (P) and ionic liquid (A)) is named $T_X$, and one derived from phase (Y) (a phase consisting of polymer block (Q)) is named $T_Y$, and $\Delta T_P$ and $\Delta T_Q$ are defined as in the following formulae, respectively. In the above, $T_P$, $T_Q$, $T_X$ and $T_Y$ are needed to be ones measured by the same measuring method, for example α transition temperature or glass transition temperature.

$$\Delta T_P = |T_P - T_X|$$

$$\Delta T_Q = |T_Q - T_Y|$$

As to these two indexes $\Delta T_P$ and $\Delta T_Q$, in the case of $\Delta T_{>2}\Delta T_Q$, ionic liquid (A) is regarded as compatible with polymer block (P), and at the same time incompatible with polymer block (Q).

Explanation is made on examples of polymer block (P) and polymer block (Q) which are constituents of block copolymer (B) used in the invention. Polymer block (P) and polymer block (Q) can be addition polymerization-type polymer blocks or condensation polymerization-type polymer blocks.

As examples of polymer block (P) and polymer block (Q), there can be mentioned olefinic polymer blocks such as polyethylene, polypropylene, polybutene, poly-3-methyl-1-pentene, polyoctene and polyisobutylene; styrenic polymer blocks such as polystyrene, poly(4-methylstyrene), poly(α-methylstyrene) and polyindene; vinyl acetate-type polymer blocks such as polyvinyl acetate, polyvinyl alcohol and polyvinyl butyral; (meth)acrylic ester-type polymer blocks such as poly(meth)acrylic acid, polymethyl(meth)acrylate, polyethyl(meth)acrylate, poly(2-hydroxyethyl)(meth)acrylate, poly(2-aminoethyl)(meth)acrylate, polybenzyl(meth)acrylate, poly(n-butyl methacrylate), poly(i-butyl methacrylate), poly(t-butyl methacrylate), polycyclohexyl methacrylate, polybornyl methacrylate and polyadamantyl methacrylate; conjugated diene-type polymer blocks such as polybutadiene, hydrogenated polybutadiene, polyisoprene, hydrogenated polyisoprene, poly(1,3-cyclohexadiene) and hydrogenated poly(1,3-cyclohexadiene); vinyl ether-type polymer blocks such as poly(methyl vinyl ether), poly(ethyl vinyl ether), poly(isobutyl vinyl ether) and poly(ethoxyethyl vinyl ether); halogen-containing vinyl-type polymer blocks such as polyvinyl chloride, polyvinylidene chloride, polyvinylidene fluoride, polyhexafluoropropylene, polytrifluoroethylene and polytetrafluoroethylene; acrylonitrile-type polymer blocks such as poly(meth)acrylonitrile; vinyl ketone-type polymer blocks such as poly(methyl vinyl ketone), poly(methyl isopropenyl ketone), poly(ethyl vinyl ketone) and poly(ethyl isopropenyl ketone); acrolein-type polymer blocks such as poly(meth)acrolein; (meth)acrylamide-type polymer blocks such as poly(meth)acrylamide, poly(N,N-dimethyl(meth)acrylamide), poly(N,N-diethyl(meth)acrylamide) and poly(N-isopropylacrylamide); etc.

Further, although not enumerated above, there can also be mentioned polymer blocks obtained by random copolymerization of constituents of polymer blocks as mentioned above; polyether-type polymer blocks such as polyethylene oxide, polyethylene glycol, polypropylene oxide, polypropylene glycol and polytetrahydrofuran; polyester-type polymer blocks such as polyethylene terephthalate, polybutylene terephthalate, polyethylene naphthalate, poly(ε-caprolactone) and poly(β-methyl-δ-valerolactone); polyamide-type polymer blocks such as polyamide-6, polyamide-6,6, polyamide-6,12, polyamide-6T, polyamide-12T and polyamide-9T; polyimide-type polymer blocks; siloxane-type polymer blocks such as polydimethylsiloxane. Further, although not enumerated above, there can also be used polymer blocks obtained by random copolymerization of constituents of polymer blocks as mentioned above, for example random copolymer blocks such as styrene-butadiene copolymer blocks. Further, there can also be used polymer blocks composed of monomers containing at the side chain a polymer part such as, for example, polyalkylene glycol (meth)acrylate, polyalkylene glycol vinyl ether, polyethylene (meth)acrylate or polypropylene (meth)acrylate; or polymer blocks containing such monomers as a copolymer component.

There is no particular restriction on preparation methods of block copolymers (B) containing these constituents, and there can, for example, be used living polymerization methods such as living anionic polymerization methods, living cationic polymerization methods and living radical polymerization methods; methods using reactions between polymers having functional group(s) at the end(s) of the molecules; etc. When conjugated dienes are used as a constituent, part or all of carbon-carbon double bonds formed by the polymerization can be hydrogenated. There is no particular restriction on hydrogenation methods, and there can, for example, be used a process wherein a block copolymer as a precursor is dissolved in an organic solvent, and hydrogen is reacted in the presence of a hydrogenation catalyst such as a Ziegler catalyst or a metallocene catalyst; etc.

Polymer block (P) and polymer block (Q) can voluntarily be selected among the above-mentioned examples of polymer blocks so long as the requisite is fulfilled to select a component compatible with ionic liquid (A) as polymer block (P) composing block copolymer (B) and a component incompatible with ionic liquid (A) as polymer block (Q).

Regardless of the kind of ionic liquid (A), but preferably when an ionic liquid having as a cation component an imidazolium cation represented by the general formula (I) is used as ionic liquid (A), more preferably when an ionic liquid selected from ethylmethylimidazolium bis(trifluoromethanesulfonyl)imide (EMITFSI), ethylmethylimidazolium bis(pentafluoroethanesulfonyl)imide (EMIPFSI), butylmethylimidazolium bis(trifluoromethanesulfonyl)imide (BMITSFI) and butylmethylimidazolium bis(pentafluoroethanesulfonyl)imide (BMIPFSI) is used as ionic liquid (A), still more preferably when EMITFSI or EMIPFSI is used as ionic liquid (A), and most preferably when EMITFSI is used as ionic liquid (A), there can be used, as polymer block (P), a homopolymer block or copolymer block in any combination of monomer(s) selected from esters of (meth)acrylic acid with an alkanol having 1 to 3, particularly 1 or 2 carbon atoms; monoesters of (meth)acrylic acid with an alkylene glycol having 2 to 4, particularly 2 or 3 carbon atoms, a dialkylene glycol having 4 to 6 carbon atoms or a trialkylene glycol having 6 to 9 carbon atoms; esters of (meth)acrylic acid with an alkoxyalkanol having 2 to 4, particularly 2 or 3 carbon atoms; esters of (meth)acrylic acid with a monomethyl or monoethyl ether of a dialkylene glycol having 4 to 6 carbon atoms or a trialkylene glycol having 6 to 9 carbon atoms; esters of (meth)acrylic acid with an aminoalkanol having 2 to 4, particularly 2 or 3 carbon atoms; vinyl acetate; acrylamide; and the like. When EMITFSI is selected, there can specifically be mentioned, as polymer block (P), a polymethyl(meth)acrylate block, a polyethyl(meth)acrylate block, a polymethoxymethyl acrylate block, a polymethoxyethyl acrylate block, a poly(diethylene glycol monomethyl ether methacrylate) block, a polyvinyl acetate block, polyacrylamide block, etc., and these are preferred in view of compatibility with ionic liquid (A) and ion conductivity.

Regardless of the kind of ionic liquid (A), but preferably when an ionic liquid having as a cation component an imidazolium cation represented by the general formula (I) is used as ionic liquid (A), more preferably when an ionic liquid selected from EMITFSI, EMIPFSI, BMITFSI and BMIPFSI is used as ionic liquid (A), still more preferably when EMITFSI or EMIPFSI is used as ionic liquid (A), and most preferably when EMITFSI is used as ionic liquid (A), there can be used, as polymer block (Q), a polymer block having as a repeating unit at least one selected from aromatic vinyl compound units represented by the general formula (VI):

wherein R represents a hydrogen atom, an alkyl group having 1 to 8 carbon atoms or an aryl group having 6 to 14 carbon atoms and optionally having 1 to 3 substituents, and Ar represents an aryl group having 6 to 14 carbon atoms and optionally having 1 to 3 substituents. In the general formula (VI), there can be mentioned, as the aryl group in R and Ar, a phenyl group, a naphthyl group, etc. As the substituent(s) of these aryl groups, there can be mentioned an alkyl group having 1 to 4, particularly 1 or 2 carbon atoms, an alkoxyl group having 1 to 4, particularly 1 or 2 carbon atoms, etc. As the alkyl group in R, one having 1 to 4, particularly 1 or 2 carbon atoms is preferred, a methyl group, an ethyl group, etc. are mentioned, and a methyl group is supremely preferred. As specific examples of the polymer block having as a repeating unit the above general formula (VI), there can be mentioned a polystyrene block, a poly(4-methylstyrene) block, a poly(α-methylstyrene) block, etc., and these are preferred in view of incompatibility with ionic liquid (A) and shape-holding properties of the polymer electrolyte.

Regardless of the kind of ionic liquid (A), but preferably when an ionic liquid having as a cation component an imidazolium cation represented by the general formula (I) is used as ionic liquid (A), more preferably when an ionic liquid selected from EMITFSI, EMIPFSI, BMITFSI and BMIPFSI is used as ionic liquid (A), still more preferably when EMITFSI or EMIPFSI is used as ionic liquid (A), and most preferably when EMITFSI is used as ionic liquid (A), there can also be used, as polymer block (Q), a crystalline polyolefin block (for example, a crystalline polyethylene block, a crystalline polypropylene block, a crystalline poly(3-methyl-1-pentene) block, etc.); a polymer block of an alkyl methacrylate ester containing as the alkyl group an alkyl group having 4 or more carbon atoms such as a polyisobutyl methacrylate block or a poly(t-butyl methacrylate) block; a polycyclohexyl methacrylate block; a polyisobornyl methacrylate block; a random copolymer block of n-butyl methacrylate or isobutyl methacrylate with isobornyl methacrylate, etc., and these are preferred in view of incompatibility with ionic liquid (A) and shape-holding properties of the polymer electrolyte.

Block copolymer (B) can also be a condensation polymerization-type block copolymer.

When copolymer (B) is a polyurethane, regardless of the kind of ionic liquid (A), but preferably when an ionic liquid having as a cation component an imidazolium cation represented by the general formula (I) is used as ionic liquid (A), more preferably when an ionic liquid selected from EMITFSI, EMIPFSI, BMITFSI and BMIPFSI is used as ionic liquid (A), still more preferably when EMITFSI or EMIPFSI is used as ionic liquid (A), and most preferably when EMITFSI is used as ionic liquid (A), there can also be used, as polymer block (P), a polymer block consisting of polymeric polyol component(s). As examples of polymeric polyol components, there can be mentioned polyester polyols, polyether polyols, polycarbonate polyols, polyester polycarbonate polyols, etc.

Polyester polyols can, for example, be prepared by subjecting a dicarboxylic acid or an ester-forming derivative thereof such as its ester or anhydride, and a low molecular polyol directly to esterification reaction or to transesterification, or by ring opening polymerizing a lactone.

As dicarboxylic acids composing polyester polyols, ones generally used for preparation of polyesters can be used, and as specific examples thereof, there can be mentioned aliphatic dicarboxylic acids such as succinic acid, glutaric acid, adipic acid, pimellic acid, suberic acid, azelaic acid, sebacic acid, dodecanedioic acid, methylsuccinic acid, 2-methylglutaric acid, 3-methylglutaric acid, trimethyladipic acid, 2-methyloctanedioic acid, 3,8-dimethyldecanedioic acid and 3,7-dimethyldecanedioic acid; alicyclic dicarboxylic acids such as cyclohexanedicarboxylic acid; aromatic dicarboxylic acids such as terephthalic acid, isophthalic acid, orthophthalic acid and naphthalenedicarboxylic acid; etc. These dicarboxylic acids can be used alone or in a combination of two or more. Among them, it is preferred to use aliphatic dicarboxylic acids, and it is particularly preferred to use at least one of adipic acid, azelaic acid and sebacic acid.

As low molecular polyols composing polyester polyols, ones generally used for preparation of polyesters can be used, and low molecular diols are preferred. As specific examples thereof, there can be mentioned aliphatic diols such as ethylene glycol, diethylene glycol, triethylene glycol, propylene glycol, 1,3-propanediol, 2-methyl-1,3-propanediol, 1,3-butylene glycol, 1,4-butanediol, 2-methyl-1,4-butanediol, neopentanediol, 1,5-pentanediol, 3-methyl-1,5-pentanediol, 1,6-hexanediol, 1,8-octanediol, 2-methyl-1,8-octanediol, 2,7-dimethyl-1,8-octanediol, 1,9-nonanediol, 2-methyl-1,9-nonanediol, 2,8-dimethyl-1,9-nonanediol, 1,10-decanediol and 2,2-diethyl-1,3-propanediol; alicyclic diols such as 1,4-cyclohexanediol, cyclohexanedimethanol, cyclooctanedimethanol and dimethylcyclooctanedimethanol; aromatic dihydric alcohols such as 1,4-bis(β-hydroxyethoxy)benzene; etc. These low molecular polyols can be used alone or in a combination of two or more.

As examples of the above-mentioned lactones, there can be mentioned ε-caprolactone, β-methyl-δ-valerolactone, etc.

As the polyether polyols, there can, for example, be mentioned polyethylene glycol, polypropylene glycol, polytetramethylene glycol, poly(methyltetramethylene glycol), etc. These polyether polyols can be used alone or in a combination of two or more.

As the polycarbonate polyols, there can, for example, be used ones obtained by reaction of an above-mentioned low molecular polyol with a carbonate compound such as a dialkyl carbonate, an alkylene carbonate or a diaryl carbonate. As the dialkyl carbonate, there can, for example, be mentioned dimethyl carbonate, diethyl carbonate, etc. As the alkylene carbonate, there can be mentioned ethylene carbonate, etc., and as the diaryl carbonate, there can be mentioned diphenyl carbonate, etc.

The polyester polycarbonate polyol can, for example, be obtained by simultaneously reacting a low molecular polyol, a dicarboxylic acid and a carbonate compound as mentioned above. The polyester polycarbonate polyol can also be obtained by previously synthesizing a polyester polyol according to the above-mentioned process and then reacting this with a carbonate compound, or by previously synthesizing a polycarbonate polyol according to the above-mentioned process and then reacting this with a dicarboxylic acid or an ester-forming derivative thereof such as its ester or acid anhydride.

Among the above-mentioned, as polymer block (P) in the case where block copolymer (B) is a polyurethane, polyester polyol blocks and polyether polyol blocks are preferred in view of compatibility with ionic liquids and ion conductivity.

The number average molecular weight of the polymeric polyol is preferably in the range of 500 to 8,000 and more preferably in the range of 700 to 5,000. When a polyurethane using a polymeric polyol having a number average molecular weight of the above range is used, a polymer electrolyte excellent in dynamic performance and moldability can be obtained.

When copolymer (B) is a polyurethane, and preferably when an ionic liquid having as a cation component an imidazolium cation represented by the general formula (I) is used as ionic liquid (A), more preferably when an ionic liquid selected from EMITFSI, EMIPFSI, BMITFSI and BMIPFSI is used as ionic liquid (A), still more preferably when EMITFSI or EMIPFSI is used as ionic liquid (A), and most preferably when EMITFSI is used as ionic liquid (A), there can be mentioned, as examples of polymer block (Q), polymer blocks which are reaction product components of a diisocyanate or an isocyanate mainly consisting of a diisocyanate with a chain extender.

As the diisocyanate used therein, there is no particular restriction, and there can, for example, be mentioned aromatic diisocyanates such as 4,4'-diphenylmethane diisocyanate, tolylene diisocyanate, phenylene diisocyanate, xylylene diisocyanate, 1,5-naphthylene diisocyanate, 3,3'-dichloro-4,4'-diphenylmethane diisocyanate and toluylene diisocyanate; aliphatic or alicyclic diisocyanates such as hexamethylene diisocyanate, isophorone diisocyanate, 4,4'-dicyclohexylmethane diisocyanate and hydrogenated xylylene diisocyanate; etc. These diisocyanates can be used alone or in a combination of two or more. Among them, in view of lowering compatibility with ionic liquids, it is preferred to use 4,4'-diphenylmethane diisocyanate.

It is also possible to use other isocyanates, namely monofunctional isocyanates or tri- or more functional polyisocyanates, but together with diisocyanates and in such a range that the effects of the invention are not spoiled. It is preferred that the proportion of other isocyanates in all the isocyanates is 5% by mass or less.

There is no particular restriction on the chain extender to be used, but it is preferred to use low molecular compounds having a molecular weight of 300 or less and having in the molecule two or more, particularly two active hydrogen atoms capable of reacting with an isocyanato group, and there can, for example, be mentioned diols such as ethylene glycol, propylene glycol, 1,4-butanediol, 1,6-hexanediol, 1,4-bis(β-hydroxyethoxy)benzene, 1,4-cyclohexanediol, bis(β-hydroxyethyl)terephthalate and xylylene glycol; diamines such as hydrazine, ethylenediamine, propylenediamine, xylylenediamine, isophoronediamine, piperazine and its derivatives, phenylelenediamine and tolylenediamine; diamides such as adipic acid dihydrazide and isophthalic acid dihydrazide; amino alcohols such as aminoethyl alcohol and aminopropyl alcohol; etc. These low molecular compounds can be used alone or in a combination of two or more. Among them, it is preferred to use aliphatic diols having 2 to 10 carbon atoms, and in view of industrial economical efficiency and easiness of polyurethane production, it is preferred to use 1,4-butanediol.

Among the above-mentioned, as polymer block (Q) where block copolymer (B) is a polyurethane, a reaction product block between 4,4'-diphenylmethane diisocyanate and 1,4-butanediol is preferred in view of incompatibility with ionic liquid (A) and shape-holding properties of the polymer electrolyte.

When a polymeric polyol, a diisocyanate and a chain extender as mentioned above are reacted to prepare a polyurethane, the mixing ratio of each component is appropriately determined taking the performance of the desired polyurethane and polymer electrolyte into account, and it is preferred to use each component so that the proportion of the isocyanato groups contained in the diisocyanate to 1 mol of active hydrogen atoms contained in the polymeric polyol and the chain extender may be 0.9 to 1.2 mols.

As to methods for preparation of the polyurethane, there is no particular restriction, and it can be prepared, utilizing known urethane reaction techniques, by either of a prepolymer method and a one-shot method, using a polymeric polyol, a diisocyanate and a chain extender as mentioned above. Among these methods, it is preferred to melt polymerize them substantially in the absence of a solvent, and continuous melt polymerization using a multi-screw extruder is particularly preferred.

As block copolymer (B), there can further be used, as ones other than the above-mentioned, for example, a block copolymer between a thermoplastic polyurethane (TPU) and another polymer, a thermoplastic polyester elastomer (TPEE; there can, for example, be mentioned one using an aromatic polyester block as a hard segment and an aliphatic polyether block or polyester block as a soft segment), a thermoplastic polyamide elastomer (TPAE; there can, for example, be mentioned one using an aromatic polyamide block as a hard segment and an aliphatic polyether block or polyester block as a soft segment), etc.

Block copolymer (B) substantially consists of polymer blocks (P) and (Q).

There is no particular restriction on the chain structure between polymer block (P) and polymer block (Q) in block copolymer (B), and there can, for example, be mentioned P-Q diblock copolymers, P-Q-P triblock copolymers, Q-P-Q triblock copolymers, P-Q-P-Q tetrablock copolymers, P-Q-P-Q-P pentablock copolymers, Q-P-Q-P-Q pentablock copolymers, etc. Among these, in view of the mechanical strength of polymer electrolytes to be obtained, Q-P-Q triblock copolymers and Q-P-Q-P-Q pentablock copolymers are preferred, and in view of easiness of preparation, Q-P-Q triblock copolymers are further preferred.

When block copolymer (B) is a polyurethane, TPEE or TPAE, it is further preferred that block copolymer (B) is a $(Q-P)_n$-type multi-block copolymer. Therein, n is any natural number.

Polymer block (P) compatible with ionic liquid (A) and polymer block (Q) incompatible therewith can be present in plural, respectively. In that case, polymer block (P) can be present in plural kinds, namely as (P1), (P2), (P3) . . . and (Px), and polymer block (Q) can be present in plural kinds, namely as (Q1), (Q2), (Q3) . . . and (Qy). Therein, x and y are any natural numbers, respectively. Also therein, (P1), (P2), (P3) . . . and (Px) on polymer block (P) can mutually be compatible or incompatible, and (Q1), (Q2), (Q3) . . . and (Qy) on polymer block (Q) can mutually be compatible or incompatible. Although not particularly restricted to it, it is preferred from a viewpoint that polymer electrolytes obtained show stable ion conductivity that polymer block (P) is present in one kind, and it is preferred in view of dynamic characteristics of polymer electrolytes or easiness of preparation of block copolymer (B) that polymer block (Q) is present in one or two kinds.

Although there is no particular restriction on the proportion in mass of polymer block (P) in block copolymer (B), in view of the mechanical strength of polymer electrolytes obtained, the proportion is preferably 95% by mass or less, more preferably 90% by mass or less and still more preferably 80% by mass or less. On the other hand, in view of the ion conductivity of polymer electrolytes obtained, the proportion in mass of polymer block (P) is preferably 5% by mass or more, more preferably 10% by mass or more and still more preferably 20% by mass or more.

As to the molecular weight of block copolymer (B), there is no particular restriction, but the molecular weight is preferably 1,000 to 2,000,000, more preferably 5,000 to 1,000,000 and still more preferably 10,000 to 500,000 as number average molecular weight. When the number average molecular weight is less than 1,000, block copolymer (B) and polymer electrolytes obtained are inferior in mechanical strength, and when the number average molecular weight is more than 2,000,000, the viscosity of block copolymer (B) becomes too large, which makes them hard to handle.

In the polymer electrolyte comprising ionic liquid (A) and block copolymer (B) as essential ingredients, the addition amount of ionic liquid (A) per 1 part by mass of block copolymer (B) is preferably 10 parts by mass or less and more preferably 5 parts by mass or less in view of the mechanical strength of the polymer electrolyte. On the other hand, the addition amount of ionic liquid (A) per 1 part by mass of block copolymer (B) is preferably 0.1 part by mass or more and more preferably 0.5 part by mass or more in view of the ion conductivity of the polymer electrolyte.

The polymer electrolyte of the invention can contain ingredient(s) other than ionic liquid (A) and block copolymer (B). As other ingredients, there is no particular restriction so long as the merits of the invention are not spoiled, and there can, for example, be used other resins, plasticizers, organic solvents, redox couples, fillers, pigments, dyes, salts, etc. These can be used alone or in a combination of plural. As to use amount thereof, there is no particular restriction, but, generally, the use amount thereof is in the range of 5 to 300 parts by mass as the total of other ingredients per 100 parts by mass of the polymer electrolyte, and its upper limit is preferably 30 parts by mass and more preferably 20 parts by mass.

In the polymer electrolyte comprising ionic liquid (A) and block copolymer (B) as essential ingredients, it is preferred in view of the self-standing properties and mechanical strength of the polymer electrolyte that ionic liquid (A) and polymer block (P) mutually dissolve each other to form a phase (X), and, at the same time, polymer block (Q) forms a phase (Y) which is incompatible with phase (X) consisting of ionic liquid (A) and polymer block (P). Therein, phase (Y) acts as a physical crosslinking point to hold the entire shape, resulting in enhancement of mechanical strength. From the viewpoint of making the polymer electrolyte of the invention function over a wider temperature range, the softening point of polymer block (Q) forming phase (Y) is preferably 60° C. or more, more preferably 80° C. or more and still more preferably 100° C. or more. As to the upper limit of the softening point of polymer block (Q), there is no particular restriction, but since when the softening point is too high, there is a case where when thermoforming of block copolymer (B) or the polymer electrolyte is made raising the temperature to a temperature higher than the softening point, block copolymer (B) heat deteriorates, the softening point is preferably 300° C. or less, more preferably 200° C. or less and still more preferably 150° C. or less. In the above, the softening point means an a transition temperature when polymer block (Q) is amorphous, and, when polymer block (Q) is crystalline, a temperature at which storage modulus in DMA (dynamic mechanical analysis) rapidly decreases (hereinafter, the latter temperature is sometimes referred to as fluidization initiation temperature).

In the polymer electrolyte comprising ionic liquid (A) and block copolymer (B) as essential ingredients, it is preferred that phase (X) and phase (Y) are mutually micro phase separated. By mutual micro phase separation, the function separation between the physical crosslinking point phase (phase (Y)) as mentioned above and phase (X) where ion conduction occurs becomes clear, and it becomes possible to make self-standing properties and mechanical strength, and ion conductivity compatible. There is no particular restriction on the shape of micro phase separation, but since ion conductivity is considered to be better when phase (X) has continuity, it is preferred as to the shape of micro phase separation in the polymer electrolyte that a micro phase separation is formed wherein phase (Y) is floating as island in the sea of phase (X) (phase (Y) is phase separated into spherical shapes, cylindrical shapes, gyroidal shapes or the like); phase (Y) and phase (X) form a lamellar structure; or, in micro phase separation structures wherein phase (X) is floating as island in the sea of phase (Y), such a structure is formed that phase (X) is phase separated into cylindrical shapes or gyroidal shapes.

There is no particular restriction on processes for preparation of polymer electrolyte of the invention, and there can, for example, be mentioned a process wherein ionic liquid (A), block copolymer (B) and, when used, other ingredients are mechanically kneaded under heating; a process wherein ionic liquid (A), block copolymer (B) and, when used, other ingredients are dissolved in an appropriate solvent and then the solvent is removed; a process wherein block copolymer (B) is impregnated with ionic liquid (A); etc. These can appropriately be selected in accordance with purposes.

Since the polymer electrolyte of the invention is excellent in self-standing properties, mechanical strength, liquid-retaining properties and ion conductivity, it is useful as an electrolyte for primary batteries and secondary batteries, an electrolyte for electrical double layer capacitors, an electrolyte for redox capacitors (pseudo capacitors), an electrolyte for fuel cells/MEAs, a binding agent for electrodes in secondary batteries, a binding agent for electrodes in electrical double layer capacitors, a binding agent for electrodes in redox capacitors, an electrolyte for dye sensitized solar cells, an electrolyte for actuator elements, etc. Particularly, from the viewpoint of being excellent in liquid-retaining properties and mechanical strength, the polymer electrolyte is promising as an electrolyte for actuator elements.

The actuator element of the invention comprises a molding consisting of the above-mentioned polymer electrolyte, and at least two electrodes bonded to the molding and mutually insulated, and the actuator element can be curved or deformed by giving an electric potential difference between the two electrodes.

There is no particular restriction on methods for preparation of the molding consisting of the polymer electrolyte, and there can, for example, be mentioned extrusion molding methods, injection molding methods, compression molding methods, roll molding methods, methods of making a membrane wherein the polymer electrolyte is dissolved in a suitable solvent and the solution is cast, methods of making a membrane by coating, etc. These can appropriately be selected in accordance with shapes of desired moldings.

There is no particular restriction as materials for the electrodes, and there can, for example, be mentioned carbon materials such as activated carbons, carbon blacks, single wall carbon nanotubes, multi wall carbon nanotubes and vapor grown carbon fibers; noble metals such as gold, platinum, iridium, palladium, ruthenium and silver; base metals such as copper and nickel; metal oxides such as ruthenium oxide ($RuO_2$), titanium oxide ($TiO_2$), tin oxide ($SnO_2$), iridium oxide ($IrO_2$), tantalum oxide ($Ta_2O_5$), vanadium oxide ($V_2O_5$) and molybdenum oxide ($MoO_x$); π-conjugated electrically conductive polymers such as polyacetylenes, polypyrroles, polyanilines and polythiophenes and derivatives thereof; etc. Among them, it is preferred in view of corrosion resistance to use carbon materials, noble metals and π-conjugated electrically conductive polymers. These can be used alone or in a combination of plural.

There is no particular restriction as methods for formation of electrodes, and, as known methods, there can, for example, be mentioned vacuum deposition methods of metals; sputtering methods of metals; electrolytic plating methods of metals; electroless plating methods of metals; a method of applying onto the polymer electrolyte an ink wherein a material for electrodes as mentioned above is dissolved or dispersed in an appropriate binder (ink application methods); a method of sticking together the polymer electrolyte and an electrode sheet or metallic foil as made separately, by press bonding or deposition (deposition methods); etc. Among them, in view of easiness of preparation, ink application methods and deposition methods are preferred. It is also possible to combine these methods in plural. As a specific example of combination, there can be mentioned a method of sticking electrode sheets made of a carbon material together and, then, vacuum depositing a metal by a vacuum deposition method.

As to the shape of the actuator element of the invention, there is no particular restriction, and there can, for example, be mentioned membranes, films, sheets, boards, fiber, rods, cubes, rectangular parallelepipeds, globes, Rugby ball shapes, complicated shapes, etc., and these can appropriately be selected in accordance with purposes of use. Also as to the thickness of the actuator element, there is no particular restriction so long as functions as an actuator can be exerted, and, for example, when the shape is membrane-shaped, the electrodes are preferably formed on both sides of the membrane, and, in view of the electrical resistance of the membrane itself, the thickness is preferably in the range of $10^{-6}$ to $10^{-1}$ m.

The actuator element of the invention is intrinsically a piezoelectric element, and, thus, can be utilized as various elements including actuator elements. As examples of elements other than actuator elements, there can be mentioned sensor elements detecting pressure, force, displacement, etc. When the actuator element of the invention is utilized as an actuator element, by applying an electric field to the electrodes mutually insulated, the element is actuated. When the actuator element of the invention is used as a sensor, by connecting the mutually insulated electrodes and a voltmeter, voltage generated when the element is deformed is sensed.

The actuator element of the invention can be actuated in the air, in water, in a vacuum and in an organic solvent. It is also possible to seal the actuator element in accordance with use environments. Sealing materials are not particularly restricted, and there can be used various resins, metals, etc.

EXAMPLES

The present invention is further specifically described below through examples, comparative examples and referential examples, but the invention is not limited by them. Measuring instruments, measuring methods and materials used in the following examples, comparative examples and referential examples, are described below.

(1) Analysis of the Molecular Structure of Block Copolymer (B) and Ionic Liquid (A) by Nuclear Magnetic Resonance Spectrum ($^1$H-NMR Spectrum)

Instrument: Nuclear magnetic resonance instrument made by JEOL. Ltd. (JNM-LA 400)

Solvent: Chloroform-d (block copolymer) or dimethyl sulfoxide-d (ionic liquid)

(2) Measurement of Number Average Molecular Weight (Mn) and Molecular Weight Distribution (Mw/Mn) by Gel Permeation Chromatography (GPC)
(Mw is weight average molecular weight)
Instrument: Gel permeation chromatograph made by TOSOH CORPORATION (HLC-8020)
Column: GMHXL, G4000HXL and G5000HXL either of which is TSKgel made by TOSOH CORPORATION, were connected in series.
Eluent: Tetrahydrofuran, flow rate 1.0 mL/minute
Calibration curve: Made using standard polystyrene
Detection method: Differential refractive index (RI)

(3) Measurement of Ion Conductivity
Instrument: Chemical Impedance Meter 3532-80 made by Hioki Denki Co., Ltd.
Method: Complex impedance method; measured using an alternating current 4-probes cell; measured after a polymer electrolyte was humidity conditioned overnight or more at 25° C./11RH %; measuring temperature 25° C.

(4) Observation of Morphology
An ultra-thin slice having a thickness of 100 nm or less was prepared using a polymer electrolyte made by a process described later, dyed with vapor of ruthenium tetroxide, and, then, observed in morphology using a transmission electron microscope (H-7100FA made by Hitachi, Ltd.).

(5) Dynamic Mechanical Analysis (DMA)
A test piece having length×width×thickness=20 mm×5 mm×1 mm was cut out from a polymer electrolyte sheet, and measurement was made with the telsile mode (frequency 11 Hz) and a heating rate of 3° C./minute using the test piece and using a rheometer ("DVE-V4FT Rheospectrer" made by Rheology Co., Ltd.). In the case of a polymer electrolyte using block copolymer (B), measurement was made observing the peak temperature of loss tangent (transition from a glass state to a liquid state), and in the case of a polymer electrolyte using poly(vinylidene fluoride-ran-hexafluoropropylene) described later, measurement was made observing as a point of fluidization initiation accompanying fusion of crystals a temperature at which storage modulus is drastically lowered.

(6) Measurement by DSC
A small amount of a polymer or a polymer electrolyte was taken, and measurement was made using DSC-822e made by METTLER Co. In the measurement, temperature was raised from room temperature to a temperature equal to or more than Tg at 30° C./minute, and that temperature was held for 5 minutes to erase thermal history. Then, temperature was lowered up to −100° C. at 10° C./minute. The temperature of −100° C. was held for 5 minutes, and, then, temperature was raised up to 150° C. at 10° C./minute with observation in the meanwhile.

(7) Tensile Test
A polymer electrolyte sheet was cut out into a dumbbell shape and, then, its breaking strength and breaking elongation were measured under a condition of a pulling rate of 20 mm/min using a universal testing machine ("TM-MS-134" made by Instron Japan Co., Ltd.).

(8) Observation of Liquid-Retaining Properties
As to a polymer electrolyte, presence or absence of bleeding-out of ionic liquid (A) from the electrolyte was visually observed, and judgment was made according to the following criterion.
○: There is no bleeding-out Δ: There is a little bleeding-out
x : There is apparent bleeding-out (9) Actuation Test of an Actuator
An actuator element cut into a size of 2 mm×7 mm was put by a length of 2 mm at its longitudinal direction between copper-made electrodes, and stuck out in the air by a length of 5 mm in the length of the element to make a measurement cell. Working electrodes (two terminals for control of electric potential and control of electric current, respectively) were connected to one of the copper-made electrodes from a potentiostat ("HA-301" made by Hokuto Denko Co., Ltd.) connecting a function generator ("HB-104" made by Hokuto Denko Co., Ltd.), and a counter electrode and a reference electrode were connected to the other copper-made electrode. In this state, the cell was fixed, and an electric potential of ±1.5V was applied between the electrodes on both sides of the actuator element, and measurement was made by measuring actuation of the element at the place of 4 mm from the fixed part of the element on the electrodes using a laser displacement meter ("LC-2440" made by Keyence Co.).

Reagents and solvents used are as follows.

(1) Styrene; Special grade styrene purchased from Kishida Chemical Co., Ltd. was contacted with alumina to remove the polymerization inhibitor, and subjected to sufficient bubbling with nitrogen before use to remove dissolved oxygen, and then used.

(2) Methyl methacrylate; Methyl methacrylate made by KURARAY CO., LTD. was contacted with zeolite to remove the polymerization inhibitor, and subjected to sufficient bubbling with nitrogen before use to remove dissolved oxygen, and then used.

(3) Methyl acrylate; Special grade methyl acrylate purchased from Kishida Chemical Co., Ltd. was contacted with zeolite to remove the polymerization inhibitor, and subjected to sufficient bubbling with nitrogen before use to remove dissolved oxygen, and then used.

(4) Ethyl acrylate; Special grade ethyl acrylate purchased from Kishida Chemical Co., Ltd. was contacted with zeolite to remove the polymerization inhibitor, and subjected to sufficient bubbling with nitrogen before use to remove dissolved oxygen, and then used.

(5) Methoxyethyl acrylate; Methoxyethyl acrylate purchased from Wako Pure Chemical Industries, Ltd. was contacted with zeolite to remove the polymerization inhibitor, and subjected to sufficient bubbling with nitrogen before use to remove dissolved oxygen, and then used.

(6) Diethylene glycol monomethyl ether methacrylate; Diethylene glycol monomethyl ether methacrylate purchased from Tokyo Kasei Kogyo Co., Ltd. was purified by distillation under reduced pressure in the presence of calcium hydride, and then used.

(7) i-butyl methacrylate; i-butyl methacrylate purchased from Tokyo Kasei Kogyo Co., Ltd. was contacted with zeolite to remove the polymerization inhibitor, and subjected to sufficient bubbling with nitrogen before use to remove dissolved oxygen, and then used.

(8) Isobornyl methacrylate; "IB-X" made by Kyoei Kagaku Co., Ltd. was purchased, and purified by distillation under reduced pressure in the presence of calcium hydride, and then used.

(9) (Polyethylene glycol)monomethyl ether methacrylate; (Polyethylene glycol)monomethyl ether methacrylate purchased from Aldrich Co., Ltd. (number average molecular weight 1,100) was used after removal of oxygen under reduced pressure.

(10) Tetrahydrofuran; Special grade tetrahydrofuran purchased from Kishida Kagaku Co., Ltd. was purified by distillation under reduced pressure in the presence of sodium benzophenon ketyl radical, and then used.

(11) 1,1-diphenylethylene; 1,1-diphenylethylene purchased from Aldrich Co,. Ltd. was purified by distillation under reduced pressure in the presence of calcium hydride, and then used.
(12) Lithium chloride; Lithium chloride (99.998%) purchased from Aldrich Co., Ltd. was used as such.
(13) α,α'-dibromo-p-xylene; α,α'-dibromo-p-xylene purchased from Aldrich Co., Ltd. was diluted with tetrahydrofuran to a 0.095M solution, and then used.
(14) sec-butyllithium; sec-butyllithium was purchased from Asia Lithium Co., Ltd. as a 1.3M cyclohexane solution, and used as such.
(15) Acetonitrile; Special grade acetonitrile purchased from Kishida Kagaku Co., Ltd. was contacted with zeolite, and subjected to sufficient bubbling with nitrogen before use to remove dissolved oxygen, and then used.
(16) Copper bromide (I); Special grade copper bromide (I) made by Wako Pure 10 Chemical Industries, Ltd. was used as such.
(17) Copper chloride (I); Special grade copper chloride (I) made by Wako Pure Chemical Industries, Ltd. was used as such.
(18) Copper chloride (II); Special grade copper chloride (II) made by Wako Pure Chemical Industries, Ltd. was used as such.
(19) 1,1,4,7,10,10-hexamethyltriethylenetetramine (HMTETA); 1,1,4,7,10,10-hexamethyltriethylenetetramine purchased from Aldrich Co., Ltd. was used as such.
(20) Tris(2-dimethylaminoethyl)amine (Me$_6$-TREN)
A mixed aqueous solution of tris(2-aminoethyl)amine, formic acid and formaldehyde was refluxed, and the resulting product was distilled under reduced pressure, and then used.
(21) Diethyl meso-2,5-dibromoadipate; Diethyl meso-2,5-dibromoadipate purchased from Aldrich Co., Ltd. was used as such.
(22) Azobisisobutyronitrile (AIBN); AIBN purchased from Wako Pure Chemical Industries, Ltd. was recrystallized from methanol, and then used.
(23) Toluene; Special grade toluene purchased from Kishida Kagaku Co., Ltd. was contacted with zeolite, and subjected to sufficient bubbling with nitrogen before use to remove dissolved oxygen, and then used.
(24) 1-methylimidazole; 1-methylimidazole purchased from Wako Pure Chemical Industries, Ltd. was distilled under reduced pressure in the presence of calcium hydride, and then used.
(25) Bromoethane; Bromoethane purchased from Tokyo Kasei Kogyo Co., Ltd. was used as such.
(26) Lithium bis(trifluoromethylsulfonyl)imide; Lithium bis(trifluoromethylsulfonyl)imide purchased from Tokyo Kasei Kogyo Co., Ltd. was used as such.
(27) Cyclohexane; Special grade cyclohexane purchased from Kishida Kagaku Co., Ltd. was contacted with zeolite, and subjected to sufficient bubbling with nitrogen before use to remove dissolved oxygen, and then used.
(28) Butylmethylimidazolium tetrafluoroborate (BMIBF$_4$); BMIBF$_4$ purchased from Tokyo Kasei Kogyo Co., Ltd. was used as such.
Other reagents and solvents not annotated were purified according to a conventional method, and then used.
Materials used are as follows.
(1) Thermoplastic polyurethane (1); "KURAMIRON U3190" made by KURARAY CO., LTD. (thermoplastic polyurethane consisting of a polyester polyol consisting of 3-methyl-1,5-pentanediol and adipic acid, 4,4'-diphenylmethane diisocyanate and 1,4-butanediol; melt viscosity at 200° C. 15.0 kPa·s) was used as such.
(2) Thermoplastic polyurethane (2); "KURAMIRON U8180" made by KURARAY CO., LTD. (thermoplastic polyurethane consisting of a polyester polyol consisting of 3-methyl-1,5-pentanediol and adipic acid, 4,4'-diphenylmethane diisocyanate and 1,4-butanediol; melt viscosity at 200° C. 18.0 kPa·s) was used as such.
(3) Styrenic thermoplastic elastomer having a hydroxyl group at one end; "SEPTON HG-252" made by KURARAY CO., LTD. (a polymer wherein a hydroxyl group is bonded to one end of polystyrene-b-hydrogenated poly(butadiene/isoprene)-b-polystyrene) was used as such.
(4) Polymeric polyol (1); "KURARAY Polyol P-1500" made by KURARAY CO., LTD. (a polyester diol having a number average molecular weight of 1,500 prepared by reacting 3-methyl-1,5-pentanediol with adipic acid) was used as such.
(5) Poly(vinylidene fluoride-ran-hexafluoropropylene)(P(VDF/HFP)); "Kynar2801" made by ARKEMA Co. Ltd. was purchased, and used as such.
(6) Activated carbon; "YP-50F" made by KURARAY CHEMICAL CO., LTD. was used as such.
(7) Acetylene black; "DENKA BLACK" made by DENKI KAGAKU KOGYO KABUSHIKI KAISHA was purchased, and used as such.

Referential Example 1

Preparation of polystyrene-b-polymethyl methacrylate-b-polystyrene (1) A magnetic stirrer was put in 1 L round-bottomed flask wherein inside moisture had been removed completely, and a three way cock was attached. In a glove box of an argon atmosphere, 370 mg (8.73 mmol) of lithium chloride was put in the flask. The flask was taken out from the glove box, and 560 mL of tetrahydrofuran was put in the flask. This flask was immersed in a dry ice/methanol bath to cool the contents to −78° C., 2 mL of a sec-butyllithium solution (2.6 mmol as sec-butyllithium) was added dropwise. Then, 33.9 mL of styrene (297 mmol) was added dropwise gradually to this solution and polymerization was made at −78° C. for 1 hour.
(2) Then, 1.54 mL of 1,1-diphenylethylene (8.72 mmol) was added dropwise thereto. When a very little amount of the polymerization solution was taken out using a syringe, and subjected to GPC measurement, the result was Mn=18,800 and Mw/Mn=1.15. Initiator efficiency determined through calculation was 63.3%.
(3) While the temperature was held at −78° C., 26.9 mL of methyl methacrylate (252 mmol) was added gradually. By addition of methyl methacrylate, the color inside the system was change from deep red to light yellow. Polymerization was continued as such for 1 hour, and a very little amount of the polymerization solution was taken out using a syringe and subjected to GPC measurement. The result was Mn=31,200 and Mw/Mn=1.08, whereby formation of polystyrene-b-polymethyl methacrylate was confirmed.
(4) While the polymerization solution was held at −78° C., 8.66 mL of a solution of α,α'-dibromo-p-xylene in tetrahydrofuran (0.823 mmol as α,α'-dibromo-p-xylene) was added dropwise, and stirring was continued for 2 days at −78° C. Then, a small amount of methanol was added to terminate the reaction. A part was taken out and subjected to GPC measurement, and the result was Mn=56,400 and Mw/Mn=1.07 on the main peak, and the proportion of a triblock copolymer determined from area ratio in the GPC curve was 88% (namely, 12% was a polystyrene-b-polymethyl methacrylate diblock copolymer).

(5) The polymerization solution was added to a greatly excess amount of n-hexane to reprecipitate the polymer, whereby the remaining 1,1-diphenylethylene was removed, and the polymer was recovered by filtration. The resulting white powder was re-dissolved in toluene, the solution was washed with water to remove the remaining lithium salt and added to a greatly excess amount of methanol to reprecipitate the polymer, and the polymer was recovered by filtration. The polymer was vacuum dried at 50° C. for 24 hours to remove the remaining solvent and water, and then used.

(6) As described above, there was obtained a block copolymer wherein polymer block (P) is polymethyl methacrylate (PMMA) block and polymer block (Q) is polystyrene (PSt) block (hereinafter, the block copolymer is sometimes referred to as B-1). As a result of $^1$H-NMR measurement, it was revealed that, in the block copolymer, the PSt content is 58% by mass and the PMMA content is 42% by mass.

Referential Example 2

Preparation of polystyrene-b-polymethyl acrylate-b-polystyrene (1) A magnetic stirrer, 7.17 g of copper (I) bromide (50 mmol) and 3.6 g of diethyl meso-2,5-dibromoadipate (10 mmol) were put in a 2 L three-necked flask, and then, the air inside the flask was sufficiently replaced with dry nitrogen. Then, 955 mL of acetonitrile and 785 mL of methyl acrylate were added, and the mixture was stirred at room temperature for 30 minutes. Then, the mixture was warmed to 50° C., and 8.33 mL of a solution of HMTETA in acetonitrile (concentration 0.3 mol/L)(16.7 mmol as HMTETA) separately prepared was added to initiate polymerization. 2 hours after initiation of the polymerization, 2.08 mL of a solution of HMTETA in acetonitrile (concentration 0.3 mol/L)(0.62 mmol as HMTETA) was added, and polymerization was continued for further 5 hours.

(2) 5 hours later, the flask was dipped in ice water to cool the polymerization solution, resulting in termination of polymerization. At the termination of polymerization, the conversion of methyl acrylate was 32%, the number average molecular weight was 24,300 and the molecular weight distribution MW/Mn was 1.04.

(3) The resulting polymerization solution was concentrated by an evaporator, diluted with toluene and repeatedly washed with water to remove the remaining catalyst. After the washing, the polymerization solution was concentrated again by the evaporator, and added to a greatly excess amount of methanol. The resulting viscous liquid matter obtained as a re-precipitate was vacuum dried overnight at 70° C. to obtain a polymethyl acrylate whose both ends are brominated.

(4) In a 2 L three-necked flask, 40 g of the both end-bominated polymethyl acrylate obtained in (3) and a magnetic stirrer were put, and the inside air was sufficiently replaced with dry nitrogen. Then, 400 g of styrene was added to dissolve the both end-bominated polymethyl acrylate. The solution was warmed to 40° C., and a mixture of 0.7 g of copper (I) bromide (2.5 mmol), 12.3 mL of Me$_6$-TREN (3.7 mmol) and 16 mL of acetonitrile separately prepared was added to initiate polymerization.

(5) Polymerization was made at 40° C. for 5 hours, the flask was dipped in ice water to cool the polymerization solution, resulting in termination of polymerization. At the termination of polymerization, the conversion of styrene was 16%, Mn was 186,400 and the molecular weight distribution Mw/Mn was 1.74.

(6) The resulting polymerization solution was subjected to re-precipitation with a greatly excess amount of methanol. The resulting polymer was dried at room temperature and re-dissolved in toluene, and the solution was washed repeatedly with water to remove the remaining catalyst. The resulting solution was subjected to re-precipitation with a greatly excess amount of methanol, and the resulting solid was dried overnight at 70° C.

(7) As described above, there was obtained a block copolymer wherein polymer block (P) is the polymethyl acrylate (PMA) block and polymer block (Q) is the polystyrene (PSt) block (hereinafter, the block copolymer is sometimes referred to as B-10). As a result of $^1$H-NMR measurement, it was revealed that, in the block copolymer, the PSt content is 73% by mass and the PMA content is 27% by mass.

Referential Example 3

Preparation of polystyrene-b-polyethyl acrylate-b-polystyrene

The same operations as in Referential example 2 were made except that ethyl acrylate was used in place of methyl acrylate and part of stoichiometric ratios was changed, whereby a polystyrene-b-polyethyl acrylate-b-polystyrene (hereinafter, sometimes referred to as B-11). On the polymer obtained, Mn was 167,200, Mw/Mn was 1.81, and, in the block copolymer, the PSt content was 69% by mass and the polyethyl acrylate (PEA) content was 31% by mass Referential Example 4

Preparation of polystyrene-b-polymethoxyethyl acrylate-b-polystyrene

The same operations as in Referential example 2 were made except that methoxyethyl acrylate was used in place of methyl acrylate and part of stoichiometric ratios was changed, whereby a polystyrene-b-polymethoxyethyl acrylate-b-polystyrene (hereinafter, sometimes referred to as B-12). On the polymer obtained, Mn was 144,800, Mw/Mn was 1.52, and, in the block copolymer, the PSt content was 72% by mass and the polymethoxyethyl acrylate (PMOEA) content was 28% by mass Referential Example 5

Preparation of polystyrene-b-poly(diethylene glycol monomethyl ether methacrylate)-b-polystyrene The same operations as in Referential example 1 were made except that diethylene glycol monomethyl ether methacrylate was used in place of methyl methacrylate and part of stoichiometric ratios was changed, whereby a polystyrene-b-poly(diethylene glycol monomethyl ether methacrylate)-b-polystyrene (hereinafter, sometimes referred to as B-13). On the polymer obtained, Mn was 72,300, Mw/Mn was 1.06 and the proportion of a triblock copolymer determined from the GPC curve was 91%, and, in the block copolymer, the PSt content was 71% by mass and the poly(diethylene glycol monomethyl ether methacrylate) (PDEGMOMA) content was 29% by mass

Referential Example 6

Preparation of polystyrene-b-poly(diethylene glycol monomethyl ether methacrylate)-b-poly(i-butyl methacrylate-ran-isobornyl methacrylate)

(1) In an autoclave having a content volume of 1 L wherein inside moisture had been removed completely, 0.104 g of lithium chloride and 450 mL of tetrahydrofuran were put. The autoclave was dipped in a dry ice/methanol bath to cool the contents to −78° C., and then, 0.67 mL of a solution of sec-butyllithium in cyclohexane (0.87 mmol as sec-butyllithium) was added dropwise. Then, 18.4 mL of styrene (161 mmol) was added gradually and polymerization was made at −78° C. for 1 hour.

(2) Then, 0.45 mL of 1,1-diphenylethylene (2.59 mmol) was added dropwise thereto, and reaction was made at −78° C. for further 1 hour. When a very little amount of the polymerization solution was taken out from the sampling aperture, and subjected to GPC measurement, the result was Mn=34,000 and Mw/Mn=1.03. Initiator efficiency determined through calculation was 56.7%.

(3) While the temperature was held at −78° C., 18.5 mL of diethylene glycol monomethyl ether methacrylate (100 mmol) was added gradually. Polymerization was continued as such for 1 hour. When a very little amount of the polymerization solution was taken out from the sampling aperture and subjected to GPC measurement, the result was Mn=58,400 and Mw/Mn=1.05.

(4) While the temperature was held at −78° C., a mixture of 17.5 mL of isobornyl methacrylate (77 mmol) and 19.3 mL of i-butyl methacrylate (121 mmol) was added gradually. Polymerization was continued as such for 1 hour, and then, a small amount of methanol was added to terminate the polymerization.

(5) The resulting polymerization solution was added to a greatly excess amount of n-hexane to re-precipitate a polymer, whereby the remaining 1,1-diphenylethylene was removed, and the polymer was recovered by filtration.

The resulting white powder was re-dissolved in toluene, the solution was washed with water to remove the remaining lithium salt, and the polymer was re-precipitated with a greatly excess amount of methanol and recovered by filtration. The polymer was vacuum dried at 50° C. for 24 hours to remove the remaining solvent and water, and then used.

(6) As described above, there was obtained a block copolymer wherein polymer block (Q1) is a polystyrene block, polymer block (P) is a poly(diethylene glycol monomethyl ether methacrylate) block and polymer block (Q2) is poly(i-butyl methacrylate-ran-isobornyl methacrylate) block, and the block sequence is (Q1)-(P)-(Q2) (hereinafter, the block copolymer is sometimes referred to as B-14). As a result of $^1$H-NMR measurement, it was revealed that, in the block copolymer, the PSt content is 24% by mass, the PDEGMOMA content is 27% by mass, the poly(i-butyl methacrylate) (PiBMA) content is 26% by mass and the polyisobornyl methacrylate (PiBorMA) content is 23% by mass.

Referential Example 7

Preparation of Ethylmethylimidazolium bis(trifluoromethylsulfonyl)imide (EMITFSI)

(1) A mechanical stirrer equipped with an agitating blade, a three way cock and a condenser tube were attached to a 500 mL separable flask. Therein were put 250 mL of cyclohexane and 50 mL of 1-methylimidazole (0.58 mol).

1-methylimidazole was not completely dissolved in cyclohexane and a state of being separated into 2 phases was observed. While this liquid was stirred, 130 mL of bromoethane (1.74 mmol) was added dropwise at room temperature over a period of 1 hour. After completion of the dropwise addition, the mixture was heated to 80° C. to make reflux for 24 hours. In proportion to progress of reaction, a white solid was deposited.

(2) On the suspension obtained, excess bromoethane and cyclohexane were distilled off under reduced pressure, and the resulting white solid was purified by recrystallization from a mixed solvent of ethyl acetate/isopropanol (1/1 v/v). The crystal was filtered, washed with n-hexane and vacuum dried overnight at 50° C.

The amount obtained was 91 g and the yield was 83%. From $^1$H-NMR measurement of the white solid, it was confirmed that desired 3-ethyl-1-methylimidazolium bromide (EMIBr) was formed.

(3) 45 g of the EMIBr (236 mmol) obtained was put in a 500 mL separable flask to which a mechanical stirrer equipped with an agitating blade, and a three way cock had been attached. 120 mL of distilled water was put therein to dissolve EMIBr completely.

(4) An aqueous solution of 68 g of lithium bis(trifluoromethylsulfonyl)imide (236 mmol) in 240 mL of distilled water was prepared. This aqueous solution was added dropwise to the above aqueous EMIBr solution under stirring. After completion of the added dropwise, reaction was continued at 70° C. for 1 hour. The reaction mixture was separated into two phases.

(5) The lower phase was extracted from the two phases, diluted with dichloromethane, washed three times with distilled water, and heated under reduced pressure at 80° C. for 3 hours to distill off the methylene chloride and part of the water. The resulting colorless transparent liquid was vacuum dried at 120° C. for 3 days to remove water in the system completely. The amount obtained was 61 g and the yield was 67%. From $^1$H-NMR measurement of the colorless transparent liquid, it was confirmed that desired 3-ethyl-1-methylimidazolium bis(trifluoromethylsulfonyl)imide (EMITFSI) was formed.

Referential Example 8

Preparation of polystyrene-b-hydrogenated poly(butadiene/isoprene)-b-polystyrene-b-TPU A polymeric polyol (1) containing 100 ppm of dibutyltin diacetate, 1,4-butanediol (BD, a chain extender) and 4,4'-diphenylmethane diisocyanate (MDI) were fed, respectively, into the front part of the heating zone of a twin-screw extruder wherein the screws rotate in the coaxial direction (30 mmφ, L/D=36; the heating zone was considered to be divided into 3 parts of the front part, the central part and the rear part) so that the mol ratio of polymeric polyol (1):BD:MDI could be 1.0:3.5:4.5 and the total feed amount of them could be 100 g/minute, and polyurethane-forming reaction was made by continuous melt polymerization at 260° C. A polystyrene-b-hydrogenated poly(butadiene/isoprene)-b-polystyrene having a hydroxyl group at one end (made by KURARAY CO., LTD., SEPTON HG-252) was continuously fed into the central part of the twin-screw extruder so that the feed amount could be 100 g/minute to react with the reaction mixture formed by the above polyurethane-forming reaction. Distearyl phosphate was fed into the rear part of the twin-screw extruder (feed amount: 13 mg/minute), and the resulting melt was continuously extruded into water at a strand state and then cut by a pelletizer to obtain pellets. The pellets were dried at 80° C. for 4 hours to remove moisture, whereby there was obtained a polystyrene-b-hydrogenated poly(butadiene/isoprene)-b-polystyrene-b-TPU. The content of TPU (=thermoplastic polyurethane) was 50% by mass, and, therein, the component derived from polymeric polyol (1) was 51% by mass (the content of the polymer block derived from polymeric polyol (1) in the whole block copolymer was 25.5% by mass).

Comparative Referential Example 1

Preparation of a Graft Copolymer Having a Polyethylene Glycol Chain as a Side Chain A mechanical stirrer equipped with an agitating blade, a three way cock and a condenser tube were attached to a 500 mL separable flask. There were added 200 mL of toluene, 33 mL of styrene (288 mmol) and 15 g of poly(ethylene glycol) methyl ether methacrylate [an ester between poly(ethylene glycol) monomethyl ether and methacrylic acid] (when its number average molecular weight is supposed to be 1,100, 13.6 mmol) to obtain a solution. Therein was added 7 mg of azobisisobutyronitrile, and the mixture was heated at 80° C. in an atmosphere of nitrogen to start polymerization. After polymerization was conducted for 5 hours, further 5 mg of azobisisobutyronitrile was added, the mixture was heated to 95° C. and polymerization was continued for further 3 hours. After completion of the polymerization, the polymerization solution was diluted with toluene and re-precipitation was made with a greatly excess amount of methanol to obtain a polymer (hereinafter sometimes referred to as PSt-g-PEG). On the polymer, Mn was 173,000, Mw/Mn was 1.72, the PSt content was 62% by mass and the poly(ethylene glycol) methyl ether methacrylate content was 38% by mass.

Comparative Referential Example 2

Preparation of a Polymer Consisting of a Bifunctional Diisocyanate and 1,4-butanediol A magnetic stirrer was put in a 300 mL round-bottomed flask and a three way cock was attached to the flask. Therein were put 150 mL of toluene and 25 g of 4,4'-diphenylmethane diisocyanate (100 mmol). With holding room temperature, 9 g of 1,4-butanediol (100 mmol) was added dropwise and stirring was continued overnight at room temperature. The resulting reaction mixture was concentrated by an evaporator and the concentrate was vacuum dried overnight at 50° C. to obtain a polycondensate between 4,4'-diphenylmethane diisocyanate and 1,4-butanediol.

Referential Example 9

Preparation of a Polymer Electrolyte Membrane (1) 1 g of the block copolymer obtained in Referential example 1 was completely dissolved in 20 mL of tetrahydrofuran, and when 0.84 g of EMITFSI was added, a uniform solution was obtained. Since the amount of PMMA contained in 1 g of copolymer (B-1) is 0.42 g, the composition ratio of EMITFSI:PMMA in this polymer electrolyte is 2:1 by mass.

(2) This solution was poured into a box of length×width×height=9 cm×10 cm×3 cm made of polytetrafluoroethylene to form a membrane having a thickness of about 200 μm. The membrane was vacuum dried overnight at 30° C., put in a desiccator containing an aqueous saturated lithium chloride solution and preserved at 25° C./11Rh %.

(3) Thus obtained polymer electrolyte membrane was used for measurement of ion conductivity and production of actuator elements.

Referential Example 10

Preparation of a Polymer Electrolyte Sheet (1) 10 g of the block copolymer (B-1) obtained in Referential example 1 was completely dissolved in 50 mL of tetrahydrofuran, 8.4 g of EMITFSI was added to this solution to obtain a uniform solution. This solution was cast on glass and dried. The resulting transparent and flexible solid was vacuum dried overnight at 50° C. to obtain a polymer electrolyte (E-5).

(2) The polymer electrolyte was hot pressed at 200° C. using a mold of thickness×length×width=1 mm×10 cm×18 cm to obtain a polymer electrolyte sheet.

(3) Thus obtained polymer electrolyte sheet was used for DMA and in tensile tests.

Comparative Referential Example 3

Preparation of a Polymer Electrolyte Using poly(vinylidene fluoride-ran-hexafluoropropylene) Random Copolymer To 10 g of a poly(vinylidene fluoride-ran-hexafluoropropylene) random copolymer (P(VDF/HFP), "Kynar #2801" made by ARKEMA Co. Ltd.) was added 20 g of EMITFSI, followed by sufficient mixing, whereby a mixture in a slurry state was obtained. The mixture was heated at 130° C. for 1 hour to be a transparent and uniform liquid matter. The liquid matter was cooled at room temperature to obtain a colorless, transparent and gel-like polymer electrolyte (E-22).

The molecular structures of block copolymers (B) used in Examples 1 to 20 described later are shown in Table 1. Block copolymers B-1, B-10, B-11, B-12, B-13 and B-14 are block copolymers obtained in Referential examples 1 to 6, respectively. Block copolymers B-2 to B-9 were prepared in the same manner as in Referential example 1 except that the use amount of each ingredient used was changed.

TABLE 1

| Block copolymer | P component | Q component | Polymer structure | P content (% by mass) | Mn* |
|---|---|---|---|---|---|
| B-1 | PMMA | PSt | Q-P-Q | 42 | 56,400 |
| B-2 | PMMA | PSt | Q-P-Q | 36 | 12,200 |
| B-3 | PMMA | PSt | Q-P-Q | 37 | 50,900 |
| B-4 | PMMA | PSt | Q-P-Q | 38 | 84,500 |
| B-5 | PMMA | PSt | Q-P-Q | 76 | 33,600 |
| B-6 | PMMA | PSt | Q-P-Q | 57 | 35,200 |
| B-7 | PMMA | PSt | Q-P-Q | 37 | 27,700 |
| B-8 | PMMA | PSt | Q-P-Q | 18 | 41,400 |
| B-9 | PMMA | PSt | Q-P-Q | 62 | 85,400 |
| B-10 | PMA | PSt | Q-P-Q | 27 | 186,400 |
| B-11 | PEA | PSt | Q-P-Q | 31 | 167,200 |
| B-12 | PMOEA | PSt | Q-P-Q | 28 | 144,800 |
| B-13 | PDEGMOMA | PSt | Q-P-Q | 29 | 72,300 |
| B-14 | PDEGMOMA | Q1: PSt Q2: P (iBMA-r-iBorMA)** | Q1-P-Q2 | 27 | 134,200 |

*Mn of GPC main peak
**Poly (i-butyl methacrylate-ran-isobornyl methacrylate)

Examples 1 to 20

Polymer Electrolytes

Polymer electrolytes E-1 to E-4 and E-6 to E-20 were prepared in the same manner as in Referential example 10 except that a block copolymer in Table 1 was used as block copolymer (B), EMITFSI or BMIBF4 was used as ionic liquid (A), and the (A)/(B) ratio by mass was appropriately changed. The compositions of these polymer electrolytes and polymer electrolyte E-5 prepared in Referential example 10 are shown in Table 2.

TABLE 2

| Example | Polymer electrolyte | Block copolymer (B) | Ionic liquid (A) | (A)/(B) mass ratio | (A)/(P) mass ratio* |
|---|---|---|---|---|---|
| 1 | E-1 | B-9 | EMITFSI | 0.62 | 1 |
| 2 | E-2 | B-9 | EMITFSI | 1.24 | 2 |
| 3 | E-3 | B-9 | EMITFSI | 1.86 | 3 |
| 4 | E-4 | B-1 | EMITFSI | 0.42 | 1 |
| 5 | E-5 | B-1 | EMITFSI | 0.84 | 2 |
| 6 | E-6 | B-1 | EMITFSI | 1.26 | 3 |
| 7 | E-7 | B-1 | EMITFSI | 2.10 | 5 |
| 8 | E-8 | B-2 | EMITFSI | 0.72 | 2 |
| 9 | E-9 | B-3 | EMITFSI | 0.74 | 2 |
| 10 | E-10 | B-4 | EMITFSI | 0.76 | 2 |
| 11 | E-11 | B-5 | EMITFSI | 1.52 | 2 |
| 12 | E-12 | B-6 | EMITFSI | 1.14 | 2 |
| 13 | E-13 | B-7 | EMITFSI | 0.74 | 2 |
| 14 | E-14 | B-8 | EMITFSI | 0.36 | 2 |
| 15 | E-15 | B-10 | EMITFSI | 0.81 | 3 |
| 16 | E-16 | B-11 | EMITFSI | 0.93 | 3 |
| 17 | E-17 | B-12 | EMITFSI | 0.84 | 3 |
| 18 | E-18 | B-13 | EMITFSI | 0.87 | 3 |
| 19 | E-19 | B-14 | EMITFSI | 0.81 | 3 |
| 20 | E-20 | B-13 | BMIBF$_4$ | 0.87 | 3 |

*Proportion in mass of ionic liquid (A) to polymer block (P) contained in block copolymer (B)

Comparative Example 1

Polymer Electrolyte

The composition of a polymer electrolyte prepared in the same manner as in Referential example 10 using the graft copolymer having a polyethylene glycol chain as a side chain obtained in Comparative referential example 1 (PSt-g-PEG) and EMITFSI is shown in Table 3.

TABLE 3

| Polymer electrolyte | Polymer (B) | Ionic liquid (A) | (A)/(B) mass ratio | (A)/(P) mass ratio |
|---|---|---|---|---|
| E-21 | PSt-g-PEG in Com. ref. exam. 1 | EMITFSI | 0.76 | 2 |

Com. ref. exam.: Comparative referential example

Comparative Example 2 and Comparative Example 3

Polymer Electrolytes

The compositions of polymer electrolyte E-22 prepared in Comparative referential example 3 and a polymer electrolyte E-23 prepared in the same manner as in Comparative referential example 3 are shown in Table 4.

TABLE 4

| Polymer electrolyte | Polymer (B) | Ionic liquid (A) | (A)/(B) mass ratio |
|---|---|---|---|
| E-22 | Kynar2801 | EMITFSI | 2 |
| E-23 | Kynar2801 | EMITFSI | 5 |

Referential Measurement Examples 1 to 6

DMA (Dynamic Mechanical Analysis) of Block Copolymers (B)

DMA was made on block copolymers (B-1), (B-10), (B-11), (B-12), (B-13) and (B-14), and the results are shown in Table 5.

TABLE 5

| | Ref. meas. exam. 1 | Ref. meas. exam. 2 | Ref. meas. exam. 3 | Ref. meas. exam. 4 | Ref. meas. exam. 5 | Ref. meas. exam. 6 |
|---|---|---|---|---|---|---|
| Subject of measurement | B-1 | B-10 | B-11 | B-12 | B-13 | B-14 |
| Tα of P component | 142 | 29 | −7 | −28 | −40 | −39 |
| Tα of Q component | 116 | 118 | 121 | 120 | 114 | 116* |

※ Unit of figures in the table is ° C.
*From the measurement, It is unclear that from which of the polystyrene and the poly(i-butyl methacrylate-ran-isobornyl methacrylate) in the Q component the Tα is derived, but the Q component had its Tα at 116° C., and, in higher temperatures, block copolymer (B-14) could not hold its shape, and was fluid.
Ref. meas. exam.: Referential measurement example

Measurement Examples 1 to 10

DMA of Polymer Electrolytes

DMA was made on polymer electrolytes (E-4) to (E-7) and (E-15) to (E-20), and the results are shown in Table 6.

TABLE 6

| | Meas. exam. 1 | Meas. exam. 2 | Meas. exam. 3 | Meas. exam. 4 | Meas. exam. 5 | Meas. exam. 6 | Meas. exam. 7 | Meas. exam. 8 | Meas. exam. 9 | Meas. exam. 10 |
|---|---|---|---|---|---|---|---|---|---|---|
| Subject of measurement | E-4 | E-5 | E-6 | E-7 | E-15 | E-16 | E-17 | E-18 | E-19 | E-20 |
| Tα of phase X | 56 | 8 | −4 | −29 | −48 | −62 | −64 | −67 | −64 | −63 |
| Tα of phase Y | 116 | 118 | 115 | 114 | 118 | 115 | 119 | 117 | 114* | 118 |

TABLE 6-continued

|  | Meas. exam. 1 | Meas. exam. 2 | Meas. exam. 3 | Meas. exam. 4 | Meas. exam. 5 | Meas. exam. 6 | Meas. exam. 7 | Meas. exam. 8 | Meas. exam. 9 | Meas. exam. 10 |
|---|---|---|---|---|---|---|---|---|---|---|
| $\Delta T_P$ | 86 | 134 | 146 | 171 | 77 | 55 | 36 | 24 | 25 | 23 |
| $\Delta T_Q$ | 0 | 2 | 1 | 2 | 0 | 6 | 1 | 3 | 2 | 4 |
| $\Delta T_P/\Delta T_Q$ | ∞ | 67 | 146 | 85.5 | ∞ | 9.2 | 36 | 8 | 12.5 | 5.75 |

※Unit of figures in the table is °C.
*From the measurement, It is unclear that from which of the polystyrene and the poly(i-butyl methacrylate-ran-isobornyl methacrylate) in phase Y the Tα is derived, but phase Y had its Tα at 114° C., and, in higher temperatures, block copolymer (E-19) could not hold its shape, and was fluid.
Meas. exam.: Measurement example Referential Measurement Example 7 and Comparative Measurement Example 1

DSC of the Graft Copolymer and the Polymer Electrolyte Using It

DSC was conducted on PSt-g-PEG prepared in Comparative referential example 1 and polymer electrolyte (E-21) using it, and the results are shown in Table 7.

TABLE 7

|  | Ref. meas. exam. 7 | Com. meas. exam. 1 |
|---|---|---|
| Subject of measurement | PSt-g-PEG | E-21 |
| Tg of P component | 18 | — |
| Tg of Q component | 103 | — |
| Tg of phase X | — | −74 |
| Tg of phase Y | — | 103 |
| $\Delta T_P$ | — | 92 |
| $\Delta T_Q$ | — | 0 |
| $\Delta T_P/\Delta T_Q$ | — | ∞ |

※Unit of figures in the table is °C.
※In measurement of PSt-g-PEG, the crystalline melting peak of PEG was observed at 44° C., separately from Tg, but in the case of polymer electrolyte (E-21), any crystalline melting peak was not observed and only Tg was observed.
Ref. meas. exam.: Referential measurement example
Com. meas. exam.: Comparative measurement example Referential Measurement Example 8 and Comparative Measurement Examples 2 and 3

DMA was conducted on P(VDF/HFP) and the polymer electrolytes (E-22) and (E-23) using it, and the results are shown in Table 8.

TABLE 8

|  | Ref. meas. exam. 8 | Com. meas. exam. 2 | Com. meas. exam. 3 |
|---|---|---|---|
| Subject of measurement | P(VDF/HFP) | E-22 | E-23 |
| Fluidization initiation point | 131 | 89 | 58 |

※Unit of figures in the table is °C.

Examples 21 to 23

The compositions of polymer electrolytes prepared according to the same manner as in Referential example 10 are shown in Table 9.

TABLE 9

| Example | Polymer electrolyte | Block copolymer (B) | Ionic liquid (A) | (A)/(B) mass ratio |
|---|---|---|---|---|
| 21 | E-24 | Thermoplastic polyurethane (1) | EMITFSI | 3 |
| 22 | E-25 | Thermoplastic polyurethane (2) | EMITFSI | 3 |
| 23 | E-26 | Ref. exam. 8* | EMITFSI | 1.5** |

*Polystyrene-b-hydrogenated poly(butadiene/isoprene)-b-polystyrene-b-TPU
**The use amount of the ionic liquid to that of TPU becomes 3-fold in terms of mass.
Ref. exam.: Referential example Referential Measurement Examples 9 to 11 and Measurement Examples 11 to 13

DMA of Block Copolymers and Polymer Electrolytes

DMA was conducted on thermoplastic polyurethane (1), thermoplastic polyurethane (2), polystyrene-b-hydrogenated poly(butadiene/isoprene)-b-polystyrene-b-TPU and polymer electrolytes (E-24) to (E-26) using these polymers, respectively, and the results are shown in Table 10.

TABLE 10

|  | Ref. meas. exam. 9 | Ref. meas. exam. 10 | Ref. meas. exam. 11 | Meas. exam. 11 | Meas. exam. 12 | Meas. exam. 13 |
|---|---|---|---|---|---|---|
| Subject of measurement | Thermo. polyure. (1) | Thermo. polyure. (2) | Ref. exam. 8 | E-24 | E-25 | E-26 |
| Tα of P component | 2 | −14 | −1 | — | — | — |
| Tα of Q component | 180 | 192 | 112* | — | — | — |
| Tα of phase X | — | — | — | −46 | −67 | −39 |
| Tα of phase Y | — | — | — | 157 | 179 | 108 |
| $\Delta T_P$ | — | — | — | 48 | 53 | 38 |
| $\Delta T_Q$ | — | — | — | 23 | 13 | 4 |
| $\Delta T_P/\Delta T_Q$ | — | — | — | 2.09 | 4.08 | 9.5 |

※ Unit of figures in the table is °C.
*The temperature is presumed to be Tα of the polystyrene. In higher temperatures, the sample became fluid, and DMA was impossible.
Thermo. polyure.: thermoplastic polyurethane Comparative Examples 4 and 5

Polymer Electrolytes

An electrolyte (E-27) consisting of the condensate between MDI and 1,4-butanediol obtained in Comparative referential example 2, and EMITFSI (mass ratio 1:3), and an electrolyte (E-28) consisting of polymeric polyol (1) and EMITFSI (mass ratio 1:3) were prepared, and, as a result, (E-27) is paste-like and (E-28) is liquid, and both could not hold a shape and did not function as a solid electrolyte.

Measurement Example 14

Morphological Observation of a Polymer Electrolyte

Morphological observation of polymer electrolyte (E-5) was made. The result is shown in FIG. 2. In the figure, the dark parts are phase (Y) (PSt phase) and the light parts are phase (X) (phase of PMMA+ionic liquid)

In Table 5 and Table 6, from comparison between Referential measurement example 1 and Measurement examples 1 to 4, comparison between Referential measurement example 2 and Measurement example 5, comparison between Referential measurement example 3 and Measurement example 6, comparison between Referential measurement example 4 and Measurement example 7, comparison between Referential measurement example 5 and Measurement examples 8 and 10, and comparison between Referential measurement example 6 and Measurement example 9, it is understood that ionic liquid (A) is selectively compatible with polymer block (P) to form phase (X), and polymer block (Q) is incompatible with ionic liquid (A) to form phase (Y).

Further, from Measurement example 14 (FIG. 2), it is understood that, in the polymer electrolyte of the invention, phase (X) and phase (Y) are mutually incompatible, and form a micro phase separation structure.

Further, from comparison between Measurement examples 1 to 10 (Table 6) and Comparative measurement examples 2 and 3 (Table 8), it is understood that the polymer electrolytes of the invention are superior in heat resistance.

Further, also from comparison between Referential measurement examples 9 to 11 and Measurement examples 11 to 13 in Table 10, it is understood that ionic liquid (A) is selectively compatible with polymer block (P) to form phase (X), and polymer block (Q) forms phase (Y) incompatible with phase (X).

Further, on one hand, solid electrolytes were obtained in Examples 21 to 23, but, on the other hand, any solid electrolyte was not obtained in Comparative examples 4 and 5, and it was difficult, in the first place, to use it as a polymer electrolyte.

Measurement Examples 15 to 33 and Comparative Measurement Examples 4 to 6

Measurement of ion conductivity and observation of liquid-retaining properties were made on polymer electrolytes (E-5) to (E-20) (Table 6), (E-24) to (E-26) (Table 9) and (E-21) to (E-23) (Table 3 and Table 4), and the results are shown in Table 11.

TABLE 11

|  |  | Measurement example | | | | | | |
|---|---|---|---|---|---|---|---|---|
|  |  | 15 | 16 | 17 | 18 | 19 | 20 | 21 |
| Polymer electrolyte | — | E-5 | E-6 | E-7 | E-8 | E-9 | E-10 | E-11 |
| Ion conductivity | mS/cm | 0.170 | 0.489 | 1.520 | 0.136 | 0.146 | 0.080 | 0.319 |
| Liq.-retai. prop. | — | ○ | ○ | ○ | ○ | ○ | ○ | ○ |

|  |  | Measurement example | | | | | | |
|---|---|---|---|---|---|---|---|---|
|  |  | 22 | 23 | 24 | 25 | 26 | 27 | 28 |
| Polymer electrolyte | — | E-12 | E-13 | E-14 | E-15 | E-16 | E-17 | E-18 |
| Ion conductivity | mS/cm | 0.189 | 0.111 | 0.085 | 1.106 | 3.187 | 5.842 | 6.319 |
| Liq.-retai. prop. | — | ○ | ○ | ○ | ○ | ○ | ○ | ○ |

|  |  | Measurement example | | | | | Com. meas. exam. | | |
|---|---|---|---|---|---|---|---|---|---|
|  |  | 29 | 30 | 31 | 32 | 33 | 4 | 5 | 6 |
| Polymer electrolyte | — | E-19 | E-20 | E-24 | E-25 | E-26 | E-21 | E-22 | E-23 |
| Ion conductivity | mS/cm | 4.912 | 0.712 | 3.595 | 4.371 | 1.387 | 1.216 | 2.640 | 6.532 |
| Liq.-retai. prop. | — | ○ | ○ | ○ | ○ | ○ | X | X | X |

Liq.-retai. prop.: Liquid-retaining properties

From Measurement examples 15 to 33, it is understood that the polymer electrolytes of the invention show high ion conductivities and, at the same time, are excellent in liquid-retaining properties, and, thus, can suitably be utilized in electrochemical devices including actuator elements.

On the other hand, from Comparative measurement examples 4 to 6, it is understood that the polymer electrolytes wherein ionic liquid (A) is held by the graft copolymer or P(VDF/HFP) are excellent in ion conductivity, but poor in liquid-retaining properties, and, thus, when they are utilized as electrochemical devices, particularly as actuator elements, leak of electrolyte liquid is liable to occur.

Measurement Examples 34 to 42 and Comparative Referential Examples 7 to 9

Tensile Test of Polymer Electrolytes

The tensile test was conducted on polymer electrolytes (E-9) (Table 2), (E-15) to (E-19) (Table 2), (E-24) to (E-26) (Table 9) and (E-21) to (E-23) (Tables 3 and 4). The results are shown in Table 12.

TABLE 12

|  |  | Measurement example | | | | | | |
|---|---|---|---|---|---|---|---|---|
|  |  | 34 | 35 | 36 | 37 | 38 | 39 | 40 |
| Polymer electrolyte | — | E-9 | E-15 | E-16 | E-17 | E-18 | E-19 | E-24 |
| Breaking strength | MPa | 3.15 | 6.21 | 4.23 | 3.74 | 3.91 | 7.94 | 4.84 |
| Breaking elongation | % | 51 | 99 | 84 | 103 | 72 | 81 | 1185 |

|  |  | Measurement example | | Com. meas. exam. | | |
|---|---|---|---|---|---|---|
|  |  | 41 | 42 | 7 | 8 | 9 |
| Polymer electrolyte | — | E-25 | E-26 | E-21 | E-22 | E-23 |
| Breaking strength | MPa | 6.21 | 9.5 | 0.85 | 1.07 | 0.09 |
| Breaking elongation | % | 1026 | 1295 | 17 | 56 | 32 |

※ It was confirmed in Comparative measurement examples 7 and 8 that, at the time of the tensile test, when the sample was fixed by the chuck, ion liquid (A) was exuded.

From comparison between Measurement examples 34 to 42 and Comparative measurement examples 7 to 9, it is understood that the polymer electrolytes of the invention are superior in breaking strength, and, thus, can suitably be used as an electrolyte for electrochemical devices, particularly actuator elements.

As understood from the above results, in the polymer electrolytes of the invention, phase (X) consisting of polymer block (P) and ionic liquid (A), and phase (Y) consisting of polymer block (Q) are formed, and phase (X) and phase (Y) micro phase separate from each other. Further, the polymer electrolyte membranes of the invention not only show practically satisfactory ion conductivities, but also are excellent in liquid-retaining properties of ionic liquid (A). Furthermore, the polymer electrolytes of the invention can be used at higher temperatures, compared with the polymer electrolytes using P(VDF/HFP).

Further, it was found that when block copolymer (B) is used, superior ion conductivities are attained even if a less amount of ionic liquid (A) is used compared to where P(VDF/HFP) is used. This is apparent from the fact that, in polymer electrolytes E-17 and E-18, the ionic liquid is used in a proportion by mass of 0.84 and 0.87, respectively per 1 of the polymer (Table 2), and, in polymer electrolyte E-22, the ionic liquid is used in a proportion by mass of 2 per 1 of the polymer (Table 4), while the ion conductivities of E-17 and E-18 are higher than that of E-22. Such merit is presumed to occur from that a structure formed by micro phase separation acts as ion channels having high ion conduction ability. It is understood from this effect that the polymer electrolyte of the invention is also excellent in industrial economical efficiency through reduce of use amount of expensive ionic liquids.

Example 24

Production of an Actuator Element Using a Polymer Electrolyte Membrane (1) In a mortar were put 0.1 g of activated carbon ("YP-50F" made by KURARAY CO., LTD.), 0.06 g of acetylene black ("DENKA Black" made by DENKI KAGAKU KOGYO KABUSHIKI KAISHA), 0.04 g of P(VDF/HFP) ("Kynar #2801" made by ARKEMA Co. Ltd.) and 0.3 g of EMITFSI, and they were sufficiently ground by a pestle to obtain a massive material for electrodes.

(2) The massive material for electrodes was put between PET films and hot pressed at 130° C. to obtain a carbon electrode film.

(3) The membrane of polymer electrolyte (E-2) (membrane thickness about 200 μm) was put between the carbon electrode films obtained in (2), followed by hot press at 150° C., whereby was obtained an actuator film as a laminate having a structure of carbon electrode film-polymer electrolyte membrane-carbon electrode film.

(4) A strip of width 2 mm and length 7 mm was cut out from the center of this actuator film using a vertical cutter ("PF-20" made by Nishiwaki Seisaku-sho CO., LTD.), and used as an actuator element. At that time, it was confirmed that both electrodes were insulated from each other.

(5) The actuation test was conducted on this actuator element, and the results are shown in FIG. 3.

It is understood from FIG. 3 that the actuator element of the invention is swiftly displaced with application of a voltage, and effectively utilizable as an actuator.

INDUSTRIAL APPLICABILITY

The polymer electrolyte of the invention shows practically satisfactory ion conductivity, and, at the same time, is excellent in liquid-retaining properties of ionic liquids, and, therefore, the problem of liquid leak in electrochemical devices utilizing the polymer electrolyte does not readily occur. Moreover, the polymer electrolyte of the invention is also excellent in heat resistance and mechanical strength. Therefore, the polymer electrolyte of the invention can suitably be used in electrochemical devices including actuator elements.

The electrochemical device, particularly actuator element of the invention is swiftly displaced in response to application of a voltage, and, moreover, can be actuated stably over a long period of time resulting from the excellent liquid-retaining properties and excellent mechanical strength of the polymer electrolyte used, and, therefore, can suitably be used in the fields of medical instruments, micro-machines, industrial robots, personal robots, etc.

Figure 1:
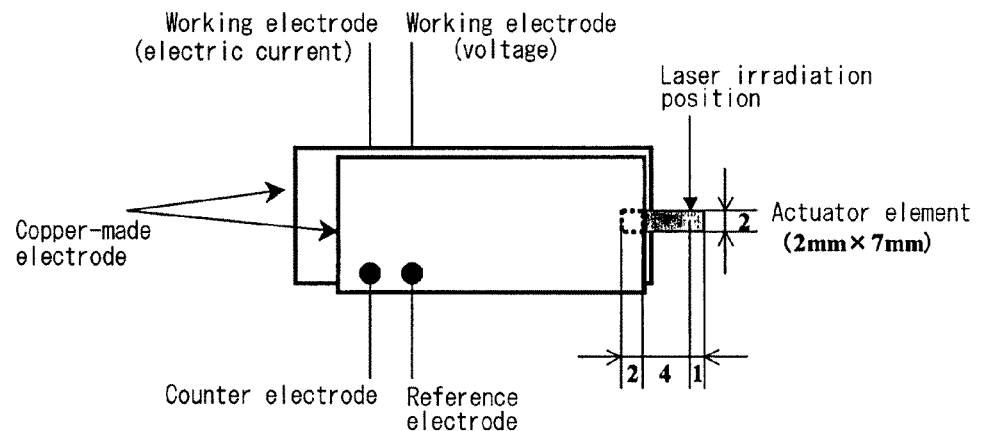
FIG. 1 is a schematic drawing of the apparatus used in the actuation test of an actuator.
Figure 2:
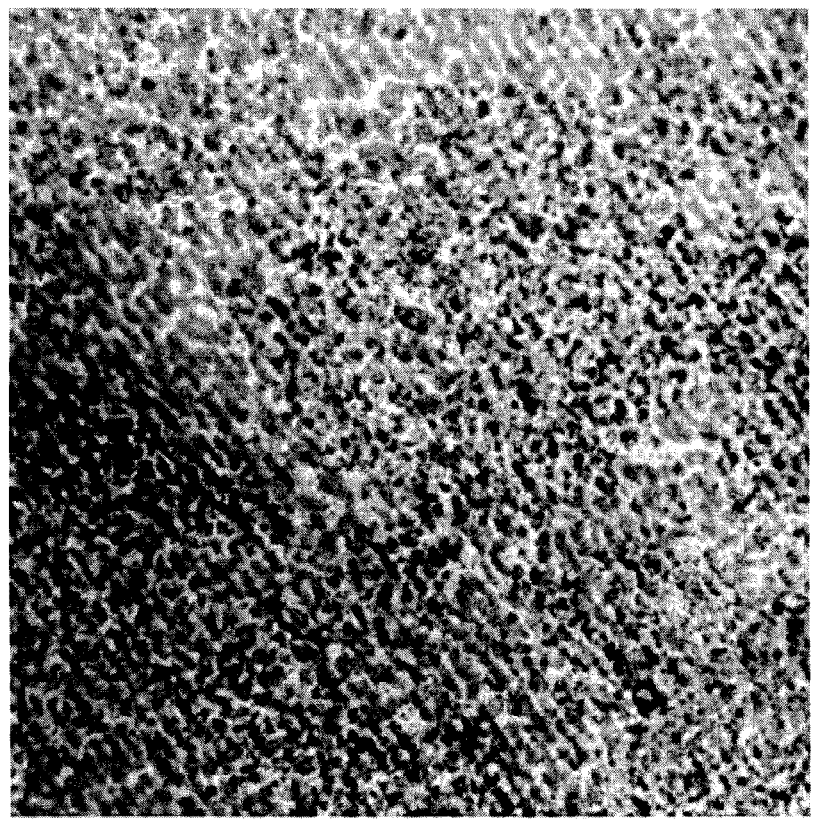
FIG. 2 is a drawing showing the result of morphological observation of polymer electrolyte (E-5) (Measurement example 8).
Figure 3:
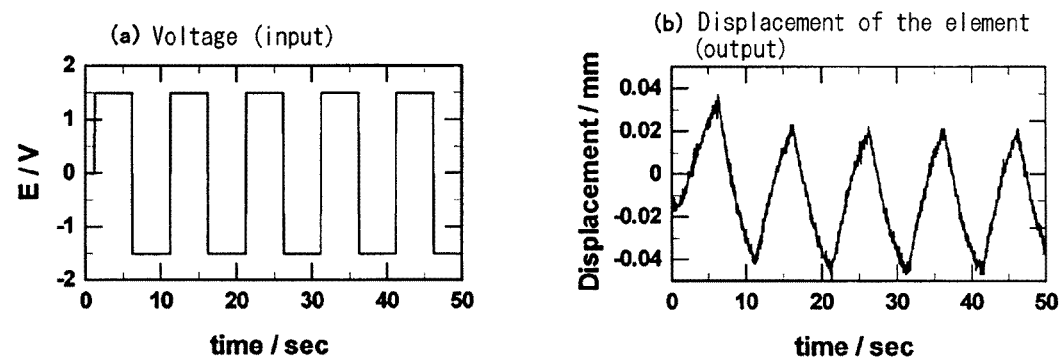
FIG. 3 is a drawing showing the result of the actuation test conducted on the actuator element produced in Example 24.

The invention claimed is:
1. A polymer electrolyte which comprises an ionic liquid (A) and a block copolymer (B), wherein
   block copolymer (B) comprises a Q-P-Q triblock copolymer or a Q-P-Q-P-Q pentablock copolymer, wherein polymer block (P) is a homopolymer block or a copolymer block of at least one members selected from the group consisting of an ester of a (meth)acrylic acid with an alkanol having 1 to 3 carbon atoms; a monoester of a (meth)acrylic acid with an alkylene glycol having 2 to 4 carbon atoms; a monoester of a (meth)acrylic acid with a dialkylene glycol having 4 to 6 carbon atoms; a monoester of a (meth)acrylic acid with a trialkylene glycol having 6 to 9 carbon atoms; an ester of a (meth)acrylic acid with an alkoxyalkanol having 2 to 4 carbon atoms; an ester of a (meth)acrylic acid with a monomethyl ether of a dialkylene glycol having 4 to 6 carbon atoms; an ester of a (meth)acrylic acid with a monomethyl ether of a trialkylene glycol having 6 to 9 carbon atoms; an ester of a (meth)acrylic acid with a monoethyl ether of a dialkylene glycol having 4 to 6 carbon atoms; an ester of a (meth)acrylic acid with a monoethyl ether of a trialkylene glycol having 6 to 9 carbon atoms; and an ester of a (meth)acrylic acid with an aminoalkanol having 2 to 4 carbon atoms, and polymer block (Q) is a polymer block having an aromatic vinyl compound unit as a repeating unit; a crystalline polyolefin block; a polymer block of an ester of methacrylic acid with an alkanol having 4 or more carbon atoms; a polycyclohexyl methacrylate block; a polyisobornyl methacrylate block; a random copolymer block of n-butyl methacrylate or isobutyl methacrylate with isobornyl methacrylate; and the polymer block (P) is compatible with ionic liquid (A) and the polymer blocks (O) are incompatible with ionic liquid (A).

2. The polymer electrolyte according to claim 1, wherein ionic liquid (A) and polymer block (P) mutually dissolve each other to form one phase (X), and polymer block (O) forms a phase (Y) that is incompatible with phase (X), and phase (X) and phase (Y) are mutually micro phase separated.

3. The polymer electrolyte according to claim 1, wherein ionic liquid (A) is an ionic liquid comprising at least one organic cation selected from the group consisting of a imidazolium cation represented by formula (I), a pyridinium cation represented by formula (II), an ammonium cation represented by formula (III), a phosphonium cation represented by formula (IV) and a sulfonium cation represented by formula (V), and at least one anion selected from the group consisting of a halogen-containing anion, a mineral acid anion and an organic acid anion:

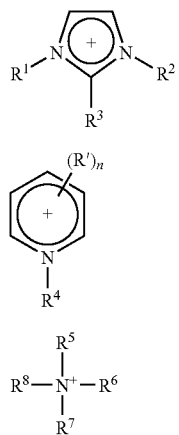

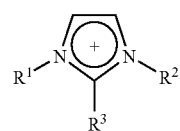

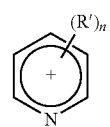

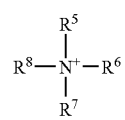

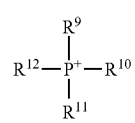

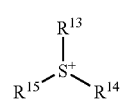

wherein
R¹ to R¹⁴, respectively, independently, represent a group selected from the group consisting of a hydrogen atom, a straight-chain or branched alkyl group having 1 to 10 carbon atoms, a straight-chain or branched alkenyl group having 2 to 10 carbon atoms, an aryl group having 6 to 15 carbon atoms, an aralkyl group having 7 to 20 carbon atoms, and (poly)oxyalkylene groups having 2 to 30 carbon atoms, R' represents a straight-chain or branched alkyl group having 1 to 6 carbon atoms, n represents an integer of from 0 to 5, and, among R⁵ to R⁸, R⁹ to R¹², and R¹³ to R¹⁵, respectively, two groups and the central hetero atom can be combined to form a cyclic structure.

4. The polymer electrolyte according to claim 1, wherein ionic liquid (A) is an ionic liquid consisting of at least one organic cation selected from the group consisting of an imidazolium cation represented by formula (I), a pyridinium cation represented by formula (II), an ammonium cation represented by formula (III), a phosphonium cation represented by formula (IV) and a sulfonium cation represented by formula (V), and at least one anion selected from the group consisting of a halogen-containing anion, a mineral acid anion and an organic acid anion:

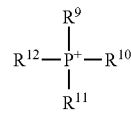

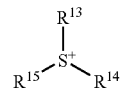

wherein
- $R^1$ to $R^{14}$, respectively, independently, represent a group selected from the group consisting of a hydrogen atom, a straight-chain or branched alkyl group having 1 to 10 carbon atoms, a straight-chain or branched alkenyl group having 2 to 10 carbon atoms, an aryl group having 6 to 15 carbon atoms, an aralkyl groups having 7 to 20 carbon atoms, and (poly)oxyalkylene groups having 2 to 30 carbon atoms,
- R' represents a straight-chain or branched alkyl group having 1 to 6 carbon atoms,
- n represents an integer of from 0 to 5, and, among $R^5$ to $R^8$, $R^9$ to $R^{12}$, and $R^{13}$ to $R^{15}$, respectively, two groups and the central hetero atom can be combined to form a cyclic structure.

5. The polymer electrolyte according to claim 3, wherein the organic cation is an imidazolium cation represented by formula (I).

6. The polymer electrolyte according to claim 5, wherein ionic liquid (A) comprises at least one member selected from the group consisting of ethylmethylimidazolium bis(trifluoromethanesulfonyl)imide, ethylmethylimidazolium bis(pentafluoroethanesulfonyl)imide, butylmethylimidazolium bis(trifluoromethanesulfonyl)imide and butylmethylimidazolium bis(pentafluoroethanesulfonyl)imide.

7. The polymer electrolyte according to claim 5, wherein ionic liquid (A) comprises ethylmethylimidazolium bis(trifluoromethanesulfonyl)imide or ethylmethylimidazolium bis(pentafluoroethanesulfonyl)imide.

8. An electrochemical device comprising the polymer electrolyte according to claim 1.

9. The polymer electrolyte according to claim 1, wherein block copolymer (B) comprises a Q-P-Q triblock copolymer.

10. The polymer electrolyte according to claim 1, wherein block copolymer (B) comprises a Q-P-Q-P-Q pentablock copolymer.

11. The polymer electrolyte according to claim 1, wherein a mass of the (P) blocks in block copolymer (B) is from 5 to 95% by mass relative to the mass of the block copolymer (B).

12. The polymer electrolyte according to claim 1, wherein ionic liquid (A) comprises at least one imidazolium cation represented by formula (I)

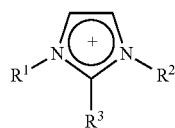

(I)

where each of $R^1$ and $R^2$ is a straight-chain or branched alkyl groups having 1 to 6 carbon atoms, and
$R^3$ represent a group selected from the group consisting of a hydrogen atom, a straight-chain or branched alkyl group having 1 to 10 carbon atoms, a straight-chain or branched alkenyl group having 2 to 10 carbon atoms, an aryl group having 6 to 15 carbon atoms, an aralkyl groups having 7 to 20 carbon atoms, and (poly)oxyalkylene groups having 2 to 30 carbon atoms.

13. The polymer electrolyte according to claim 1, wherein the ionic liquid (A) is present in the electrolyte in an amount of from 0.1 to 10 parts by mass per 1 part by mass of the block copolymer (B).

14. The polymer electrolyte according to claim 1, wherein each polymer block (O) has a softening point of at least 60° C.

15. The polymer electrolyte according to claim 1, wherein block copolymer (B) comprises a Q-P-Q triblock copolymer selected from the group consisting of
- a Q-P-Q triblock copolymer where each Q block is a polystyrene block and the P block is a polymethyl methacrylate block;
- a Q-P-Q triblock copolymer where each Q block is a polystyrene block and the P block is a polymethyl acrylate block;
- a Q-P-Q triblock copolymer where each Q block is a polystyrene block and the P block is a polyethyl acrylate block;
- a Q-P-Q triblock copolymer where each Q block is a polystyrene block and the P block is a polymethoxyethyl acrylate block;
- a Q-P-Q triblock copolymer where each Q block is a polystyrene block and the P block is a polydiethylene glycol monomethyl ether methacrylate block; and
- a Q-P-Q triblock copolymer where a first Q block is a polystyrene block, a second Q block is an poly(i-butyl methacrylate-ran-isobornyl methacrylate) block, and the P block is a poly(diethylene glycol monomethyl ether methacrylate) block,
- a mass of the (P) blocks in block copolymer (B) is from 18 to 76% by mass of the block copolymer (B), and
- the Q-P-Q triblock copolymer has a number average molecular weight of from 12,200 to 186,400.

16. The polymer electrolyte according to claim 15, wherein
- the ionic liquid (A) comprises at least one of ethylmethylimidazolium bis(trifluoromethanesulfonyl)imide and butylmethylimidazolium tetrafluoroborate,
- a mass ratio of ionic liquid (A) to block copolymer (B) is from 0.36 to 2.10, relative to 1 part block copolymer (B), and
- a mass ratio of ionic liquid (A) to the polymer blocks (P) is from 1 to 5, relative to 1 part of polymer blocks (P).

17. The polymer electrolyte according to claim 1, wherein block copolymer (B) consists of at least one Q-P-Q triblock copolymer selected from the group consisting of
- a Q-P-Q triblock copolymer where each Q block is a polystyrene block and the P block is a polymethyl methacrylate block;
- a Q-P-Q triblock copolymer where each Q block is a polystyrene block and the P block is a polymethyl acrylate block;
- a Q-P-Q triblock copolymer where each Q block is a polystyrene block and the P block is a polyethyl acrylate block;
- a Q-P-Q triblock copolymer where each Q block is a polystyrene block and the P block is a polymethoxyethyl acrylate block;
- a Q-P-Q triblock copolymer where each Q block is a polystyrene block and the P block is a polydiethylene glycol monomethyl ether methacrylate block; and
- a Q-P-Q triblock copolymer where a first Q block is a polystyrene block, a second Q block is an poly(i-butyl methacrylate-ran-isobornyl methacrylate) block, and the P block is a poly(diethylene glycol monomethyl ether methacrylate) block,
- a mass of the (P) blocks in block copolymer (B) is from 18 to 76% by mass of the block copolymer (B), and
- the Q-P-Q triblock copolymer has a number average molecular weight of from 12,200 to 186,400.

18. The polymer electrolyte according to claim 17, wherein the ionic liquid (A) comprises at least one of ethylmethylimidazolium bis(trifluoromethanesulfonyl)imide and butylmethylimidazolium tetrafluoroborate, a mass ratio of ionic liquid (A) to block copolymer (B) is from 0.36 to 2.10, relative to 1 part block copolymer (B), and a mass ratio of ionic liquid (A) to the polymer blocks (P) is from 1 to 5, relative to 1 part of polymer blocks (P).

19. The polymer electrolyte according to claim 1, wherein polymer block (P) is a homopolymer block or a copolymer block of at least one members selected from the group consisting of a monoester of a (meth)acrylic acid with an alkylene glycol having 2 to 4 carbon atoms; a monoester of a (meth)acrylic acid with a dialkylene glycol having 4 to 6 carbon atoms; a monoester of a (meth)acrylic acid with a trialkylene glycol having 6 to 9 carbon atoms; an ester of a (meth)acrylic acid with an alkoxyalkanol having 2 to 4 carbon atoms; an ester of a (meth)acrylic acid with a monomethyl ether of a dialkylene glycol having 4 to 6 carbon atoms; an ester of a (meth)acrylic acid with a monomethyl ether of a trialkylene glycol having 6 to 9 carbon atoms; an ester of a (meth)acrylic acid with a monoethyl ether of a dialkylene glycol having 4 to 6 carbon atoms; an ester of a (meth)acrylic acid with a monoethyl ether of a trialkylene glycol having 6 to 9 carbon atoms; and an ester of a (meth)acrylic acid with an aminoalkanol having 2 to 4 carbon atoms.

* * * * *

UNITED STATES PATENT AND TRADEMARK OFFICE
CERTIFICATE OF CORRECTION

Page 1 of 1

PATENT NO. : 8,138,246 B2
APPLICATION NO. : 12/444461
DATED : March 20, 2012
INVENTOR(S) : Toshinori Kato et al.

It is certified that error appears in the above-identified patent and that said Letters Patent is hereby corrected as shown below:

On the title page, Item (86), the Application Filing Date is incorrect. Item (86) should read:

-- (86) PCT No.: PCT/JP2007/069281
§371 (c)(1),
(2), (4) Date: May 4, 2009 --

On the title page, Item (87), the PCT Pub. Date is incorrect. Item (87) should read:

-- (87) PCT Pub. No.: WO2008/044546
PCT Pub. Date: Apr. 17, 2008 --

Signed and Sealed this
Fifth Day of June, 2012

David J. Kappos
*Director of the United States Patent and Trademark Office*